US012784369B2

(12) United States Patent
Wajjala

(10) Patent No.: US 12,784,369 B2
(45) Date of Patent: Nov. 3, 2026

(54) COPY DETECTION FOR VIRTUAL ASSETS

(71) Applicant: Roblox Corporation, San Mateo, CA (US)

(72) Inventor: Phani Harish Wajjala, San Mateo, CA (US)

(73) Assignee: Roblox Corporation, San Mateo, CA (US)

( * ) Notice: Subject to any disclaimer, the term of this patent is extended or adjusted under 35 U.S.C. 154(b) by 86 days.

(21) Appl. No.: 18/914,733

(22) Filed: Oct. 14, 2024

(65) Prior Publication Data

US 2026/0105694 A1 Apr. 16, 2026

(51) Int. Cl.
*G06T 17/20* (2006.01)
*G06T 7/00* (2017.01)
*G06T 13/40* (2011.01)
*G06Q 30/018* (2023.01)

(52) U.S. Cl.
CPC .......... *G06T 17/205* (2013.01); *G06T 7/0002* (2013.01); *A63F 2300/5553* (2013.01); *G06Q 30/0185* (2013.01); *G06T 13/40* (2013.01); *G06T 2200/04* (2013.01)

(58) Field of Classification Search
CPC .................... A63F 13/79; A63F 13/792; A63F 2300/5553; A63F 2300/575; G06T 13/40; G06T 17/00; G06T 17/20; G06T 17/205; G06T 19/00; G06T 19/006; G06T 19/20
See application file for complete search history.

(56) References Cited

U.S. PATENT DOCUMENTS

2010/0057715 A1* 3/2010 Bates ...................... G06F 21/31 707/E17.014
2025/0267457 A1* 8/2025 Balmakhtar ........ H04W 12/084

OTHER PUBLICATIONS

Zaka, Bilal, Michael Steurer, and Frank Kappe. "Framework for extending plagiarism detection in virtual worlds." 2009 Third International Conference on Research Challenges in Information Science. IEEE, 2009. (Year: 2009).*

* cited by examiner

*Primary Examiner* — Ryan McCulley
(74) *Attorney, Agent, or Firm* — IP Spring

(57) ABSTRACT

Various implementations relate to methods, systems and computer readable media for detecting fragmented copies of virtual assets in a virtual platform. According to one aspect, a computer-implemented method includes generating a three-dimensional (3D) mesh of a user-generated outfit and dividing it into sub-meshes, each corresponding to a body part. Histogram of Oriented Gradients (HoG) embeddings are computed for each sub-mesh, and a hash function is applied to generate hash values. The hash values are compared to reference sub-mesh embeddings stored in an index, using a Bloom filter to reduce search traffic. If a threshold number of sub-meshes match a known high-value virtual asset, usage of the user-generated outfit is restricted. If partial matches are found, the outfit is flagged for manual review.

20 Claims, 7 Drawing Sheets

312

314

316

COPY DETECTION FOR VIRTUAL ASSETS

TECHNICAL FIELD

Implementations relate generally to digital asset management in virtual experiences, and more specifically but not exclusively, relate to methods, systems, and computer readable media to perform copy detection for virtual assets.

BACKGROUND

In some virtual platforms that host virtual experiences, users can customize their avatars by selecting from a wide variety of virtual assets, including clothing, accessories, and/or other objects. Such platforms may include marketplaces where users can purchase or trade assets, some of which are rare, high-value, or limited-edition. As virtual assets gain popularity and value, a challenge has emerged: the unauthorized copying and replication of the assets. Some users may seek to bypass the exclusivity and scarcity of high-value assets by creating replicas, which undermines the value of the legitimate items and disrupts the economy of the virtual platform, e.g., by impacting the virtual currency price of legitimate items.

One approach to addressing the issue includes using asset similarity detection that relies on image analysis or metadata comparison. The techniques compare visual features of assets or check for identical metadata tags associated with legitimate assets. While the techniques can effectively identify direct copies, they may be ineffective when it comes to detecting sophisticated attempts at replication, such as fragmenting an asset into smaller components. In such attempts, users that want to make copies of a high-value virtual asset break down the high-value asset into multiple parts, upload each part separately to make it available on the virtual platform, and reassemble them within the platform (e.g., by decorating their avatar with the multiple parts) to visually recreate the original asset. Standard similarity detection techniques are ill-equipped to handle fragmentation, as they rely on whole-asset comparisons.

Another shortcoming of existing techniques lies in the computational resources required to process large volumes of user-generated content. Virtual platforms may make available millions of user-generated outfits, each of which can potentially include numerous individual virtual assets. Performing a comprehensive comparison across all outfits requires significant processing power, more so if such comparison is to be performed in real-time or near-real-time. Current techniques, which primarily focus on direct matching of individual assets, are not optimized for handling fragmented replicas or analyzing combinations of multiple assets to determine whether they mimic a known legitimate item on the virtual platform.

Furthermore, many existing solutions do not account for the complexity of three-dimensional (3D) models used in virtual platforms to depict avatars. Assets in the environments are often represented as three-dimensional (3D) meshes, adding complexity to the detection. Outfits may be assembled by a combination of 3D meshes of different assets, all of which are layered onto an avatar to depict the avatar wearing the outfit. Traditional image-based comparison techniques fall short when attempting to analyze geometric properties and/or spatial arrangements of 3D models. As a result, duplicate outfits (or other virtual objects) constructed via asset fragmentation and/or minor geometric modifications can evade detection, allowing unauthorized copies to proliferate.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

Implementations described herein relate to methods, systems, and computer-readable media for tracking body movements of players without user-perceptible lag using a single camera feed on devices that may have limited computational processing power.

According to one aspect, a computer-implemented method determines a set of virtual assets that are part of a user-generated outfit in a virtual platform, the user-generated outfit being fittable to an avatar that participates in a virtual experience on the virtual platform; generates, by equipping a virtual mannequin with the set of virtual assets, a three-dimensional (3D) mesh, where the 3D mesh includes a set of sub-meshes, each sub-mesh corresponding to a respective body part of the virtual mannequin; computes a respective embedding for each sub-mesh in the set of sub-meshes, where the respective embedding is a Histogram of Oriented Gradients (HoG) embedding; for each sub-mesh in the set of sub-meshes, determines if the embedding of the sub-mesh matches a reference sub-mesh embedding of the virtual mannequin equipped with a reference outfit, and if the embedding of the sub-mesh matches the reference sub-mesh embedding, obtains an outfit identifier for the reference outfit; and if the outfit identifiers for the reference outfit for at least a threshold number of the sub-meshes are identical, restricts usage of the user-generated outfit on the virtual platform.

In some implementations, determining if the embedding of the sub-mesh matches the reference sub-mesh embedding includes searching an index of stored embeddings associated with individual sub-meshes of a plurality of reference outfits including the reference outfit.

In some implementations, the set of sub-meshes includes at least two sub-meshes and the threshold number is two.

In some implementations, the body parts of the virtual mannequin include two or more of: head, torso, left arm, right arm, left leg, and right leg.

In some implementations, restricting the usage of the user-generated outfit includes preventing the outfit from being equipped, displayed, or used by a user within the virtual platform.

In some implementations, if the outfit identifiers for the reference outfit are identical for less than the threshold number of the sub-meshes, a determination is made whether at least two of the outfit identifiers are identical; if at least two of the outfit identifiers are identical, the user-generated outfit is flagged for manual review; and if no two outfit identifiers are identical, if only one outfit identifier is obtained, or if there is no reference sub-mesh embedding that matches any of the plurality of sub-mesh embeddings, usage of the user-generated outfit is permitted on the virtual platform.

In some implementations, determining if the embedding of the sub-mesh matches the reference sub-mesh embedding includes: a hash function being applied to the embedding of the sub-mesh to obtain a hash value, where the hash value is unique to the embedding of the sub-mesh; a lookup operation being performed to determine whether the hash value is present in a Bloom filter, wherein the Bloom filter is a bit array and values of individual bits of the bit array are set based on respective hash values obtained by applying the hash function to sub-meshes of a plurality of reference outfits; and if the hash value is not present in the Bloom filter, a determination is made that the embedding of the sub-mesh matches no reference sub-mesh.

According to another aspect, a system includes one or more processors and memory coupled to the one or more processors storing instructions that, when executed by the one or more processors, cause the one or more processors to perform operations including: determining a set of virtual assets that are part of a user-generated outfit in a virtual platform, the user-generated outfit being fittable to an avatar that participates in a virtual experience on the virtual platform; generating, by equipping a virtual mannequin with the set of virtual assets, a three-dimensional (3D) mesh, where the 3D mesh includes a set of sub-meshes, each sub-mesh corresponding to a respective body part of the virtual mannequin; computing a respective embedding for each sub-mesh in the set of sub-meshes, where the respective embedding is a Histogram of Oriented Gradients (HoG) embedding; for each sub-mesh in the set of sub-meshes, determining if the embedding of the sub-mesh matches a reference sub-mesh embedding of the virtual mannequin equipped with a reference outfit, and if the embedding of the sub-mesh matches the reference sub-mesh embedding, obtaining an outfit identifier for the reference outfit; and if the outfit identifiers for the reference outfit for at least a threshold number of the sub-meshes are identical, restricting usage of the user-generated outfit on the virtual platform.

In some implementations, determining if the embedding of the sub-mesh matches the reference sub-mesh embedding includes searching an index of stored embeddings associated with individual sub-meshes of a plurality of reference outfits including the reference outfit.

In some implementations, the set of sub-meshes includes at least two sub-meshes and the threshold number is two.

In some implementations, the body parts of the virtual mannequin include two or more of: head, torso, left arm, right arm, left leg, and right leg.

In some implementations, restricting the usage of the user-generated outfit includes preventing the outfit from being equipped, displayed, or used by a user within the virtual platform.

In some implementations, if the outfit identifiers for the reference outfit are identical for less than the threshold number of the sub-meshes, a determination is made whether at least two of the outfit identifiers are identical; if at least two of the outfit identifiers are identical, the user-generated outfit is flagged for manual review; and if no two outfit identifiers are identical, if only one outfit identifier is obtained, or if there is no reference sub-mesh embedding that matches any of the plurality of sub-mesh embeddings, usage of the user-generated outfit is permitted on the virtual platform.

In some implementations, determining if the embedding of the sub-mesh matches the reference sub-mesh embedding includes: a hash function being applied to the embedding of the sub-mesh to obtain a hash value, where the hash value is unique to the embedding of the sub-mesh; a lookup operation being performed to determine whether the hash value is present in a Bloom filter, wherein the Bloom filter is a bit array and values of individual bits of the bit array are set based on respective hash values obtained by applying the hash function to sub-meshes of a plurality of reference outfits; and if the hash value is not present in the Bloom filter, a determination is made that the embedding of the sub-mesh matches no reference sub-mesh.

According to another aspect, a non-transitory computer-readable medium with instructions stored thereon is provided that, when executed by a processor, cause the processor to perform operations. The operations include: determining a set of virtual assets that are part of a user-generated outfit in a virtual platform, the user-generated outfit being fittable to an avatar that participates in a virtual experience on the virtual platform; generating, by equipping a virtual mannequin with the set of virtual assets, a three-dimensional (3D) mesh, where the 3D mesh includes a set of sub-meshes, each sub-mesh corresponding to a respective body part of the virtual mannequin; computing a respective embedding for each sub-mesh in the set of sub-meshes, where the respective embedding is a Histogram of Oriented Gradients (HoG) embedding; for each sub-mesh in the set of sub-meshes, determining if the embedding of the sub-mesh matches a reference sub-mesh embedding of the virtual mannequin equipped with a reference outfit, and if the embedding of the sub-mesh matches the reference sub-mesh embedding, obtaining an outfit identifier for the reference outfit; and if the outfit identifiers for the reference outfit for at least a threshold number of the sub-meshes are identical, restricting usage of the user-generated outfit on the virtual platform.

In some implementations, determining if the embedding of the sub-mesh matches the reference sub-mesh embedding includes searching an index of stored embeddings associated with individual sub-meshes of a plurality of reference outfits including the reference outfit.

In some implementations, the set of sub-meshes includes at least two sub-meshes and the threshold number is two.

In some implementations, the body parts of the virtual mannequin include two or more of: head, torso, left arm, right arm, left leg, and right leg.

In some implementations, restricting the usage of the user-generated outfit includes preventing the outfit from being equipped, displayed, or used by a user within the virtual platform.

In some implementations, if the outfit identifiers for the reference outfit are identical for less than the threshold number of the sub-meshes, a determination is made whether at least two of the outfit identifiers are identical; if at least two of the outfit identifiers are identical, the user-generated outfit is flagged for manual review; and if no two outfit identifiers are identical, if only one outfit identifier is obtained, or if there is no reference sub-mesh embedding that matches any of the plurality of sub-mesh embeddings, usage of the user-generated outfit is permitted on the virtual platform.

According to yet another aspect, portions, features, and implementation details of the systems, methods, and non-transitory computer-readable media may be combined to form additional aspects, including some aspects which omit and/or modify some or portions of individual components or features, include additional components or features, and/or other modifications, and all such modifications are within the scope of this disclosure.

DETAILED DESCRIPTION

Figure 1:
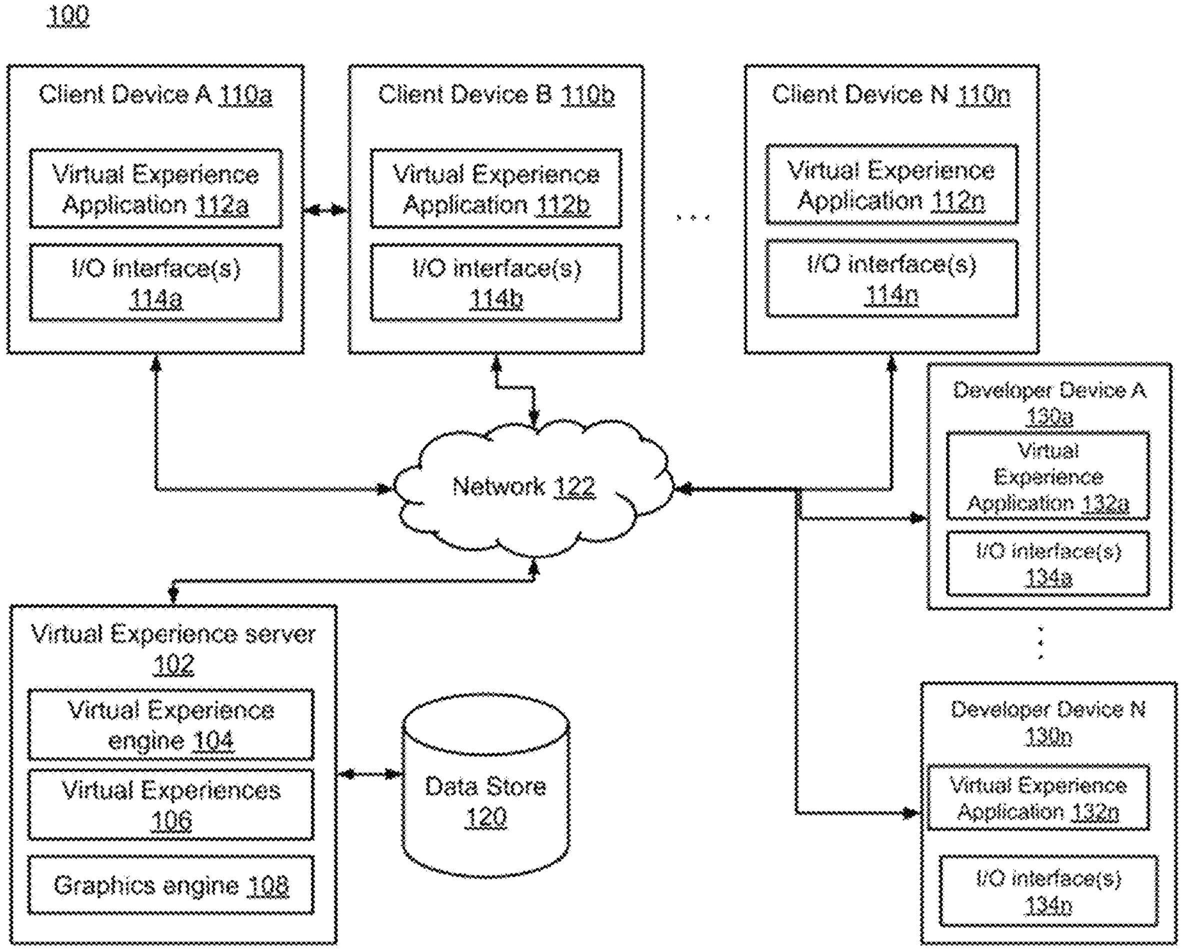
FIG. 1 is a diagram of an example system architecture, in accordance with some implementations.

In the following detailed description, reference is made to the accompanying drawings, which form a part hereof. In the drawings, similar symbols typically identify similar components, unless context dictates otherwise. The illustrative implementations described in the detailed description, drawings, and claims are not meant to be limiting. Other implementations may be utilized, and other changes may be made, without departing from the spirit or scope of the subject matter presented herein. Aspects of the present disclosure, as generally described herein, and illustrated in the Figures, can be arranged, substituted, combined, separated, and designed in a wide variety of different configurations, all of which are contemplated herein.

References in the specification to "some implementations", "an implementation", "an example implementation", etc. indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, or characteristic is described in connection with an implementation, such feature, structure, or characteristic may be effected in connection with other implementations whether or not explicitly described.

One or more implementations described herein relate to performing fragmented copy detection for virtual assets. In virtual platforms where users can create, modify, and equip avatars with various digital assets, the problem of unauthorized asset replication has emerged. Some users may bypass unauthorized copy or replica detection by fragmenting high-value or limited-edition virtual assets (e.g., avatar outfits) into smaller parts, making the parts available separately, and combining them (e.g., when decorating an avatar with accessory assets) to recreate the appearance of the original asset (e.g., outfit). Such tactics can undermine the exclusivity and value of virtual assets on the platform. The disclosed techniques address this issue through automatic detection of user-generated virtual assets (e.g., outfits) that are copies of legitimate assets (e.g., reference outfits), obtained by assembling two or more virtual assets, e.g., by decorating an avatar body with a specific set of individual virtual assets, that upon combination, provide an appearance and behavior similar to a legitimate outfit (reference outfit).

The techniques include determining the virtual assets that are combined to form a user-generated outfit and equipping a standardized virtual mannequin with those assets to generate a three-dimensional (3D) mesh. The 3D mesh is divided into multiple sub-meshes, each corresponding to predefined body parts of the mannequin, such as the head, torso, or limbs. For each sub-mesh, a feature vector is computed using a histogram of gradients (HoG) embedding, which captures the characteristics of the asset. The embeddings are compared against a reference index containing sub-mesh embeddings of known outfits, enabling detection of similarities and determination of whether the user-generated outfit contains a fragmented copy.

When a match is found between a threshold number of sub-mesh embeddings in the user-generated outfit and corresponding sub-meshes of a reference outfit, usage of the user-generated outfit on the virtual platform is restricted. Restriction may involve preventing the outfit from being equipped, displayed, and/or used by the user. In cases where only partial matches are found, such as when two sub-meshes correspond to the same reference outfit, the outfit may be flagged for manual review by platform moderators. If no match is found, the user-generated outfit is permitted for use on the platform. The use of automated detection ensures robust protection against unauthorized asset replication. Selectively performing manual review can help false positives (user-generated outfits that are falsely detected as matching a reference outfit).

In some embodiments, a hash function is applied to each HoG embedding of the sub-meshes to obtain a hash value that is unique to the HoG embedding. The hash value is inserted into a Bloom filter to provide a data structure that enables quick lookup. The Bloom filter can be utilized to perform a lookup to determine whether a particular sub-mesh embedding for a user-generated outfit matches an embedding associated with a sub-mesh of a reference outfit to rule out embeddings that do not match any known reference sub-meshes. In such a case, a hash value of the particular sub-mesh embedding is computed and if it is determined to be present in the Bloom filter, a match is detected. The use of a Bloom filter reduces computational load, since lookup of a Bloom filter is computationally efficient.

In some implementations, to create the hash function, certain properties of the HoG feature vectors are leveraged. The HoG feature vector is made up of multiple normalized histograms, where each value lies between the interval [0, 1]. This property ensures that all HoG feature vectors map to a point within a unit hypercube. This unit hypercube is divided into smaller hash hypercubes, where all HoG vectors falling into the same smaller hypercube are considered duplicates of each other. The edge length of these smaller hypercubes can be adjusted to control the granularity of the deduplication process. By tuning the edge length, the system can efficiently group similar HoG feature vectors together. To determine the appropriate hash hypercube for a given HoG feature vector, the vector is divided across each of its dimensions by the hash edge distance. This process generates a unique hash identifier for each feature vector, which is then inserted into the Bloom filter for fast comparison and lookup, further optimizing the search and matching process within the system.

Some technical advantages of one or more described features include the ability to automatically detect unauthorized fragmented copies of virtual assets by analyzing the characteristics of the assets through HoG embeddings. By dividing the 3D mesh of a user-generated outfit into sub-meshes and computing embeddings for each sub-mesh, a determination can be made of whether smaller, fragmented components of high-value assets have been reassembled to create a copy of a reference outfit (legitimate outfit).

Another technical advantage of some implementations is the use of a hash function and Bloom filters to significantly reduce computational complexity during asset comparison.

When a HoG embedding is generated for each sub-mesh, a corresponding hash value is computed, and a Bloom filter is used to quickly determine whether the hash matches any known reference sub-meshes. The Bloom filter reduces the number of unnecessary comparisons that need to be made against the full set of reference outfits. By pre-filtering non-matching embeddings using a lightweight data structure, memory usage and processing time can be reduced.

Another technical advantage of some implementations is the ability to provide flexibility in detection thresholds by restricting usage of user-generated outfits based on a configurable threshold of matching sub-meshes. For example, usage can be restricted when two or more sub-meshes of a user-generated outfit match those of a known reference outfit.

Another technical advantage of some implementations is the ability to handle real-time or near-real-time detection of fragmented copies as users generate or modify outfits on the virtual platform. By generating a 3D mesh, computing embeddings, and searching the reference index during outfit creation or modification, immediate or near-immediate feedback can be provided to a user regarding whether a user-generated outfit includes unauthorized asset combinations.

System Architecture

FIG. 1 is a diagram of an example system architecture that can be used for tracking body movements of players without user-perceptible lag using a single camera feed on devices that may have limited computational processing power. FIG. 1 and the other figures use like reference numerals to identify similar elements. A letter after a reference numeral, such as "110," indicates that the text refers specifically to the element having that particular reference numeral. A reference numeral in the text without a following letter, such as "110," refers to any or all of the elements in the figures bearing that reference numeral (e.g. "110" in the text refers to reference numerals "110*a*," "110*b*," and/or "110*n*" in the figures).

The system architecture 100 (also referred to as "system" herein) includes online virtual experience server 102, data store 120, client devices 110*a*, 110*b*, and 110*n* (generally referred to as "client device(s) 110" herein), and developer devices 130*a* and 130*n* (generally referred to as "developer device(s) 130" herein). Virtual experience server 102, data store 120, client devices 110, and developer devices 130 are coupled via network 122. In some implementations, client device(s) 110 and developer device(s) 130 may refer to the same or the same type of device.

Online virtual experience server 102 can include, among other things, a virtual experience engine 104, one or more virtual experiences 106, and graphics engine 108. In some implementations, the graphics engine 108 may be a system, application, or module that permits the online virtual experience server 102 to provide graphics and animation capability. In some implementations, the graphics engine 108 may perform one or more of the operations described below in connection with the flowchart shown in FIG. 2. In one or more additional or alternative implementations, the operations described below may be performed on one or more client devices 110, or one or more developer devices 130. In some implementations, where the operations are performed depends at least in part on computational resources, e.g., memory, processing power, or disk space. A client device 110 can include a virtual experience application 112, and input/output (I/O) interfaces 114 (e.g., input/output devices). The input/output devices can include one or more of a microphone, speakers, headphones, display device, mouse, keyboard, game controller, touchscreen, virtual reality consoles, etc.

A developer device 130 can include a virtual experience application 132, and input/output (I/O) interfaces 134 (e.g., input/output devices). The input/output devices can include one or more of a microphone, speakers, headphones, display device, mouse, keyboard, game controller, touchscreen, virtual reality consoles, etc.

System architecture 100 is provided for illustration. In different implementations, the system architecture 100 may include the same, fewer, more, or different elements configured in the same or different manner as that shown in FIG. 1.

In some implementations, network 122 may include a public network (e.g., the Internet), a private network (e.g., a local area network (LAN) or wide area network (WAN)), a wired network (e.g., Ethernet network), a wireless network (e.g., an 802.11 network, a Wi-Fi® network, or wireless LAN (WLAN)), a cellular network (e.g., a 5G network, a Long Term Evolution (LTE) network, etc.), routers, hubs, switches, server computers, or a combination thereof.

In some implementations, the data store 120 may be a non-transitory computer readable memory (e.g., random access memory), a cache, a drive (e.g., a hard drive), a flash drive, a database system, or another type of component or device capable of storing data. The data store 120 may include multiple storage components (e.g., multiple drives or multiple databases) that may span multiple computing devices (e.g., multiple server computers). In some implementations, data store 120 may include cloud-based storage.

In some implementations, the online virtual experience server 102 can include a server having one or more computing devices (e.g., a cloud computing system, a rackmount server, a server computer, cluster of physical servers, etc.). In some implementations, the online virtual experience server 102 may be an independent system, may include multiple servers, or be part of another system or server.

In some implementations, the online virtual experience server 102 may include one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, and/or hardware components that may be used to perform operations on the online virtual experience server 102 and to provide a user with access to online virtual experience server 102. The online virtual experience server 102 may include a website (e.g., a web page) or application back-end software that may be used to provide a user with access to content provided by online virtual experience server 102. For example, users may access online virtual experience server 102 using the virtual experience application 112 on client devices 110.

In some implementations, virtual experience session data are generated via online virtual experience server 102, virtual experience application 112, and/or virtual experience application 132, and are stored in data store 120. With permission from virtual experience participants, virtual experience session data may include associated metadata, e.g., virtual experience identifier(s); device data associated with the participant(s); demographic information of the participant(s); virtual experience session identifier(s); chat transcripts; session start time, session end time, and session duration for each participant; relative locations of participant avatar(s) within a virtual experience environment;

purchase(s) within the virtual experience by one or more participants(s); accessories utilized by participants; etc.

In some implementations, online virtual experience server 102 may be a type of social network providing connections between users or a type of user-generated content system that enables users (e.g., end-users or consumers) to communicate with other users on the online virtual experience server 102, where the communication may include voice chat (e.g., synchronous and/or asynchronous voice communication), video chat (e.g., synchronous and/or asynchronous video communication), or text chat (e.g., 1:1 and/or N:N synchronous and/or asynchronous text-based communication). A record of some or all user communications may be stored in data store 120 or within virtual experiences 106. The data store 120 may be utilized to store chat transcripts (text, audio, images, etc.) exchanged between participants.

In some implementations of the disclosure, a "user" may be represented as a single individual. However, other implementations of the disclosure include a "user" (e.g., creating user) being an entity controlled by a set of users or an automated source. For example, a set of individual users federated as a community or group in a user-generated content system may be considered a "user."

In some implementations, online virtual experience server 102 may be or include a virtual gaming server. For example, the gaming server may provide single-player or multiplayer games to a community of users that may access a "system" herein that includes online virtual experience server 102, data store 120, and client device 110 and/or may interact with virtual experiences using client devices 110 via network 122. In some implementations, virtual experiences (including virtual realms or worlds, virtual games, other computer-simulated environments) may be 2D virtual experiences, 3D virtual experiences (e.g., 3D user-generated virtual experiences), virtual reality (VR) experiences, or augmented reality (AR) experiences, for example. In some implementations, users may participate in interactions (such as gameplay) with other users. In some implementations, a virtual experience may be experienced in near-real-time with other users of the virtual experience.

In some implementations, virtual experience engagement may refer to the interaction of one or more participants using client devices (e.g., 110) within a virtual experience (e.g., 106) or the presentation of the interaction on a display or other output device (e.g., 114) of a client device 110. For example, virtual experience engagement may include interactions with one or more participants within a virtual experience or the presentation of the interactions on a display of a client device.

In some implementations, a virtual experience 106 can include an electronic file that can be executed or loaded using software, firmware or hardware configured to present the virtual experience content (e.g., digital media item) to an entity. In some implementations, a virtual experience application 112 may be executed and a virtual experience 106 rendered in connection with a virtual experience engine 104. In some implementations, a virtual experience 106 may have a common set of rules or common goal, and the environment of a virtual experience 106 shares the common set of rules or common goal. In some implementations, different virtual experiences may have different rules or goals from one another.

In some implementations, virtual experiences may have one or more environments (also referred to as "virtual experience environments", "virtual environments", or "virtual spaces" herein) where multiple environments may be linked. An example of a virtual environment may be a three-dimensional (3D) environment. The one or more environments of a virtual experience 106 may be collectively referred to as a "world" or "virtual experience world" or "gaming world" or "virtual world" or "virtual space" or "universe" herein. An example of a world may be a 3D world of a virtual experience 106. For example, a user may build a virtual environment that is linked to another virtual environment created by another user. A character (avatar) of the virtual experience may cross the virtual border to enter the adjacent virtual environment.

It may be noted that 3D environments or 3D worlds use graphics that use a three-dimensional representation of geometric data representative of virtual experience content (or at least present virtual experience content to appear as 3D content whether or not 3D representation of geometric data is used). 2D environments or 2D worlds use graphics that use two-dimensional representation of geometric data representative of virtual experience content.

In some implementations, the online virtual experience server 102 can host one or more virtual experiences 106 and can permit users to interact with the virtual experiences 106 using a virtual experience application 112 of client devices 110. Users of the online virtual experience server 102 may play, create, interact with, or build virtual experiences 106, communicate with other users, and/or create and build objects (e.g., also referred to as "item(s)" or "virtual experience objects" or "virtual experience item(s)" herein) of virtual experiences 106.

For example, in generating user-generated virtual items, users may create characters (avatars), decoration for the characters, one or more virtual environments for an interactive virtual experience, or build structures used in a virtual experience 106, among others. In some implementations, users may buy, sell, or trade virtual experience objects, such as in-platform currency (e.g., virtual currency), with other users of the online virtual experience server 102. In some implementations, online virtual experience server 102 may transmit virtual experience content to virtual experience applications (e.g., 112). In some implementations, virtual experience content (also referred to as "content" herein) may refer to any data or software instructions (e.g., virtual experience objects, virtual experience, user information, video, images, commands, media item, etc.) associated with online virtual experience server 102 or virtual experience applications. In some implementations, virtual experience objects (e.g., also referred to as "item(s)" or "objects" or "virtual objects" or "virtual experience item(s)" herein) may refer to objects that are used, created, shared or otherwise depicted in virtual experience applications 106 of the online virtual experience server 102 or virtual experience applications 112 of the client devices 110. For example, virtual experience objects may include a part, model, character, accessories, tools, weapons, clothing, buildings, vehicles, currency, flora, fauna, components of the aforementioned (e.g., windows of a building), and so forth.

It may be noted that the online virtual experience server 102 hosting virtual experiences 106, is provided for purposes of illustration. In some implementations, online virtual experience server 102 may host one or more media items that can include communication messages from one user to one or more other users. With user permission and express user consent, the online virtual experience server 102 may analyze chat transcripts data to improve the virtual experience platform. Media items can include, but are not limited to, digital video, digital movies, digital photos, digital music, audio content, melodies, website content, social media updates, electronic books, electronic magazines, digital newspapers, digital audio books, electronic journals, web blogs, real simple syndication (RSS) feeds, electronic comic books, software applications, etc. In some implementations, a media item may be an electronic file that can be executed or loaded using software, firmware or hardware configured to present the digital media item to an entity.

In some implementations, a virtual experience 106 may be associated with a particular user or a particular group of users (e.g., a private virtual experience), or made widely available to users with access to the online virtual experience server 102 (e.g., a public virtual experience). In some implementations, where online virtual experience server 102 associates one or more virtual experiences 106 with a specific user or group of users, online virtual experience server 102 may associate the specific user(s) with a virtual experience 106 using user account information (e.g., a user account identifier such as username and password).

In some implementations, online virtual experience server 102 or client devices 110 may include a virtual experience engine 104 or virtual experience application 112. In some implementations, virtual experience engine 104 may be used for the development or execution of virtual experiences 106. For example, virtual experience engine 104 may include a rendering engine ("renderer") for 2D, 3D, VR, or AR graphics, a physics engine, a collision detection engine (and collision response), sound engine, scripting functionality, animation engine, artificial intelligence engine, networking functionality, streaming functionality, memory management functionality, threading functionality, scene graph functionality, or video support for cinematics, among other features. The components of the virtual experience engine 104 may generate commands that help compute and render the virtual experience (e.g., rendering commands, collision commands, physics commands, etc.) In some implementations, virtual experience applications 112 of client devices 110, respectively, may work independently, in collaboration with virtual experience engine 104 of online virtual experience server 102, or a combination of both.

In some implementations, both the online virtual experience server 102 and client devices 110 may execute a virtual experience engine (104 and 112, respectively). The online virtual experience server 102 using virtual experience engine 104 may perform some or all the virtual experience engine functions (e.g., generate physics commands, rendering commands, etc.), or offload some or all the virtual experience engine functions to virtual experience engine 104 of client device 110. In some implementations, each virtual experience 106 may have a different ratio between the virtual experience engine functions that are performed on the online virtual experience server 102 and the virtual experience engine functions that are performed on the client devices 110. For example, the virtual experience engine 104 of the online virtual experience server 102 may be used to generate physics commands in cases where there is a collision between at least two virtual experience objects, while the additional virtual experience engine functionality (e.g., generate rendering commands) may be offloaded to the client device 110. In some implementations, the ratio of virtual experience engine functions performed on the online virtual experience server 102 and client device 110 may be changed (e.g., dynamically) based on virtual experience engagement conditions. For example, if the number of users engaging in a particular virtual experience 106 meets a threshold number, the online virtual experience server 102 may perform one or more virtual experience engine functions that were performed by the client devices 110.

For example, users may be playing a virtual experience 106 on client devices 110, and may send control instructions (e.g., user inputs, such as right, left, up, down, user selection, or character position and velocity information, etc.) to the online virtual experience server 102. Subsequent to receiving control instructions from the client devices 110, the online virtual experience server 102 may send experience instructions (e.g., position and velocity information of the characters participating in the group experience or commands, such as rendering commands, collision commands, etc.) to the client devices 110 based on control instructions. For instance, the online virtual experience server 102 may perform one or more logical operations (e.g., using virtual experience engine 104) on the control instructions to generate experience instruction(s) for the client devices 110. In other instances, online virtual experience server 102 may pass one or more of the control instructions from one client device 110 to other client devices (e.g., from client device 110*a* to client device 110*b*) participating in the virtual experience 106. The client devices 110 may use the experience instructions and render the virtual experience for presentation on the displays of client devices 110.

In some implementations, the control instructions may refer to instructions that are indicative of actions of a character (i.e., avatar) of the user within the virtual experience. For example, control instructions may include user input to control action within the experience, such as right, left, up, down, user selection, gyroscope position and orientation data, force sensor data, etc. The control instructions may include character position and velocity information. In some implementations, the control instructions are sent directly to the online virtual experience server 102. In other implementations, the control instructions may be sent from a client device 110 to another client device (e.g., from client device 110*b* to client device 110*n*), where the other client device generates experience instructions using the local virtual experience engine 104. The control instructions may include instructions to play a voice communication message or other sounds from another user on an audio device (e.g., speakers, headphones, etc.), for example voice communications or other sounds generated using the audio spatialization techniques as described herein.

In some implementations, experience instructions may refer to instructions that enable a client device 110 to render a virtual experience, such as a multiparticipant virtual experience. The experience instructions may include one or more of user input (e.g., control instructions), character position and velocity information, or commands (e.g., physics commands, rendering commands, collision commands, etc.).

In some implementations, virtual experience engine 104 or virtual experience application 112 may perform various techniques of the copy detection process described herein. For example, virtual experience engine 104 may generate 3D meshes of user-generated outfits equipped by avatars within the virtual platform. The virtual experience engine 104 may replace the avatar of the user with a standardized virtual mannequin and equip the user-generated outfit onto the mannequin. Virtual experience application 112 may then compute sub-meshes for each body part of the virtual mannequin and generate corresponding HoG embeddings. These embeddings may be hashed using a hash function and compared to reference embeddings stored in a nearest-neighbor index, with the results used to identify potential copies of rare or high-value virtual assets.

In some implementations, characters (or virtual experience objects generally) are constructed from components, one or more of which may be selected by the user, that automatically join together to aid the user in editing.

In some implementations, a character is implemented as a 3D model and includes a surface representation used to draw the character (also known as a skin or mesh) and a hierarchical set of interconnected bones (also known as a skeleton or rig). The rig may be utilized to animate the character and to simulate motion and action by the character. The 3D model may be represented as a data structure, and one or more parameters of the data structure may be modified to change various properties of the character, e.g., dimensions (height, width, girth, etc.); body type; movement style; number/type of body parts; proportion (e.g., shoulder and hip ratio); head size; etc.

One or more characters (also referred to as an "avatar" or "model" herein) may be associated with a user where the user may control the character to facilitate an interaction of the user with the virtual experience 106.

In some implementations, a character may include components such as body parts (e.g., hair, arms, legs, etc.) and accessories (e.g., t-shirt, glasses, decorative images, tools, etc.). In some implementations, body parts of characters that are customizable include head type, body part types (arms, legs, torso, and hands), face types, hair types, and skin types, among others. In some implementations, the accessories that are customizable include clothing (e.g., shirts, pants, hats, shoes, glasses, etc.), weapons, or other tools.

In some implementations, for some asset types, e.g., shirts, pants, etc. the online virtual experience platform may provide users access to simplified 3D virtual object models that are represented by a mesh of a low polygon count, e.g., between about 20 and about 30 polygons.

In some implementations, the user may control the scale (e.g., height, width, or depth) of a character or the scale of components of a character. In some implementations, the user may control the proportions of a character (e.g., blocky, anatomical, etc.). It may be noted that is some implementations, a character may not include a character virtual experience object (e.g., body parts, etc.) but the user may control the character (without the character virtual experience object) to facilitate the interaction of the user with the virtual experience (e.g., a puzzle game where there is no rendered character game object, but the user still controls a character to control in-game action).

In some implementations, a component, such as a body part, may be a primitive geometrical shape such as a block, a cylinder, a sphere, etc., or some other primitive shape such as a wedge, a torus, a tube, a channel, etc. In some implementations, a creator module may publish a character of a user for view or use by other users of the online virtual experience server 102. In some implementations, creating, modifying, or customizing characters, other virtual experience objects, virtual experiences 106, or virtual experience environments may be performed by a user using an I/O interface (e.g., developer interface) and with or without scripting (or with or without an application programming interface (API)). It may be noted that for purposes of illustration, characters are described as having a humanoid form. It may further be noted that characters may have any form such as a vehicle, animal, animate or inanimate object, or other creative form.

In some implementations, the online virtual experience server 102 may store characters created by users in the data store 120. In some implementations, the online virtual experience server 102 maintains a character catalog and virtual experience catalog that may be presented to users. In some implementations, the virtual experience catalog includes images of virtual experiences stored on the online virtual experience server 102. In addition, a user may select a character (e.g., a character created by the user or other user) from the character catalog to participate in the chosen virtual experience. The character catalog includes images of characters stored on the online virtual experience server 102. In some implementations, one or more of the characters in the character catalog may have been created or customized by the user. In some implementations, the chosen character may have character settings defining one or more of the components of the character.

In some implementations, a character of a user can include a configuration of components, where the configuration and appearance of components and more generally the appearance of the character may be defined by character settings. In some implementations, the character settings of a character of a user may at least in part be chosen by the user. In other implementations, a user may choose a character with default character settings or character settings chosen by other users. For example, a user may choose a default character from a character catalog that has predefined character settings, and the user may customize the default character by changing some of the character settings (e.g., adding a shirt with a customized logo). The character settings may be associated with a particular character by the online virtual experience server 102.

In some implementations, the client device(s) 110 may each include computing devices such as personal computers (PCs), mobile devices (e.g., laptops, mobile phones, smart phones, tablet computers, or netbook computers), network-connected televisions, gaming consoles, etc. In some implementations, a client device 110 may be referred to as a "user device." In some implementations, one or more client devices 110 may connect to the online virtual experience server 102 at any given moment. It may be noted that the number of client devices 110 is provided as illustration. In some implementations, any number of client devices 110 may be used.

In some implementations, each client device 110 may include an instance of the virtual experience application 112, respectively. In one implementation, the virtual experience application 112 may permit users to use and interact with online virtual experience server 102, such as control a virtual character in a virtual experience hosted by online virtual experience server 102, or view or upload content, such as virtual experiences 106, images, video items, web pages, documents, and so forth. In one example, the virtual experience application may be a web application (e.g., an application that operates in conjunction with a web browser) that can access, retrieve, present, or navigate content (e.g., virtual character in a virtual experience, etc.) served by a web server. In another example, the virtual experience application may be a native application (e.g., a mobile application, app, virtual experience program, or a gaming program) that is installed and executes local to client device 110 and enables users to interact with online virtual experience server 102. The virtual experience application may render, display, or present the content (e.g., a web page, a media viewer) to a user. In an implementation, the virtual experience application may include an embedded media player (e.g., a Flash® or HTML5 player) that is embedded in a web page.

According to aspects of the disclosure, the virtual experience application may be an online virtual experience server application for users to build, create, edit, upload content to the online virtual experience server 102 as well as interact with online virtual experience server 102 (e.g., engage in virtual experiences 106 hosted by online virtual experience server 102). As such, the virtual experience application may be provided to the client device(s) 110 by the online virtual experience server 102. In another example, the virtual experience application may be an application that is downloaded from a server.

In some implementations, each developer device 130 may include an instance of the virtual experience application 132, respectively. In one implementation, the virtual experience application 132 may permit a developer user(s) to use and interact with online virtual experience server 102, such as control a virtual character in a virtual experience hosted by online virtual experience server 102, or view or upload content, such as virtual experiences 106, images, video items, web pages, documents, and so forth. In one example, the virtual experience application may be a web application (e.g., an application that operates in conjunction with a web browser) that can access, retrieve, present, or navigate content (e.g., virtual character in a virtual experience, etc.) served by a web server. In another example, the virtual experience application may be a native application (e.g., a mobile application, app, virtual experience program, or a gaming program) that is installed and executes local to client device 110 and enables users to interact with online virtual experience server 102. The virtual experience application may render, display, or present the content (e.g., a web page, a media viewer) to a user. In an implementation, the virtual experience application may include an embedded media player (e.g., a Flash® or HTML5 player) that is embedded in a web page.

According to aspects of the disclosure, the virtual experience application 132 may be an online virtual experience server application for users to build, create, edit, upload content to the online virtual experience server 102 as well as interact with online virtual experience server 102 (e.g., provide and/or engage in virtual experiences 106 hosted by online virtual experience server 102). As such, the virtual experience application may be provided to the client device(s) 110 by the online virtual experience server 102. In another example, the virtual experience application 132 may be an application that is downloaded from a server. Virtual experience application 132 may be configured to interact with online virtual experience server 102 and obtain access to user credentials, user currency, etc. for one or more virtual experiences 106 developed, hosted, or provided by a virtual experience developer.

In some implementations, a user may login to online virtual experience server 102 via the virtual experience application. The user may access a user account by providing user account information (e.g., username and password) where the user account is associated with one or more characters available to participate in one or more virtual experiences 106 of online virtual experience server 102. In some implementations, with appropriate credentials, a virtual experience developer may obtain access to virtual experience virtual objects, such as in-platform currency (e.g., virtual currency), avatars, special powers, accessories, which are owned by or associated with other users.

In general, functions described in one implementation as being performed by the online virtual experience server 102 can be performed by the client device(s) 110, or a server, in other implementations if appropriate. In addition, the functionality attributed to a particular component can be performed by different or multiple components operating together. The online virtual experience server 102 can be accessed as a service provided to other systems or devices through suitable application programming interfaces (hereinafter "APIs"), and thus is not limited to use in websites.

Copy Detection for Virtual Assets

Figure 2:
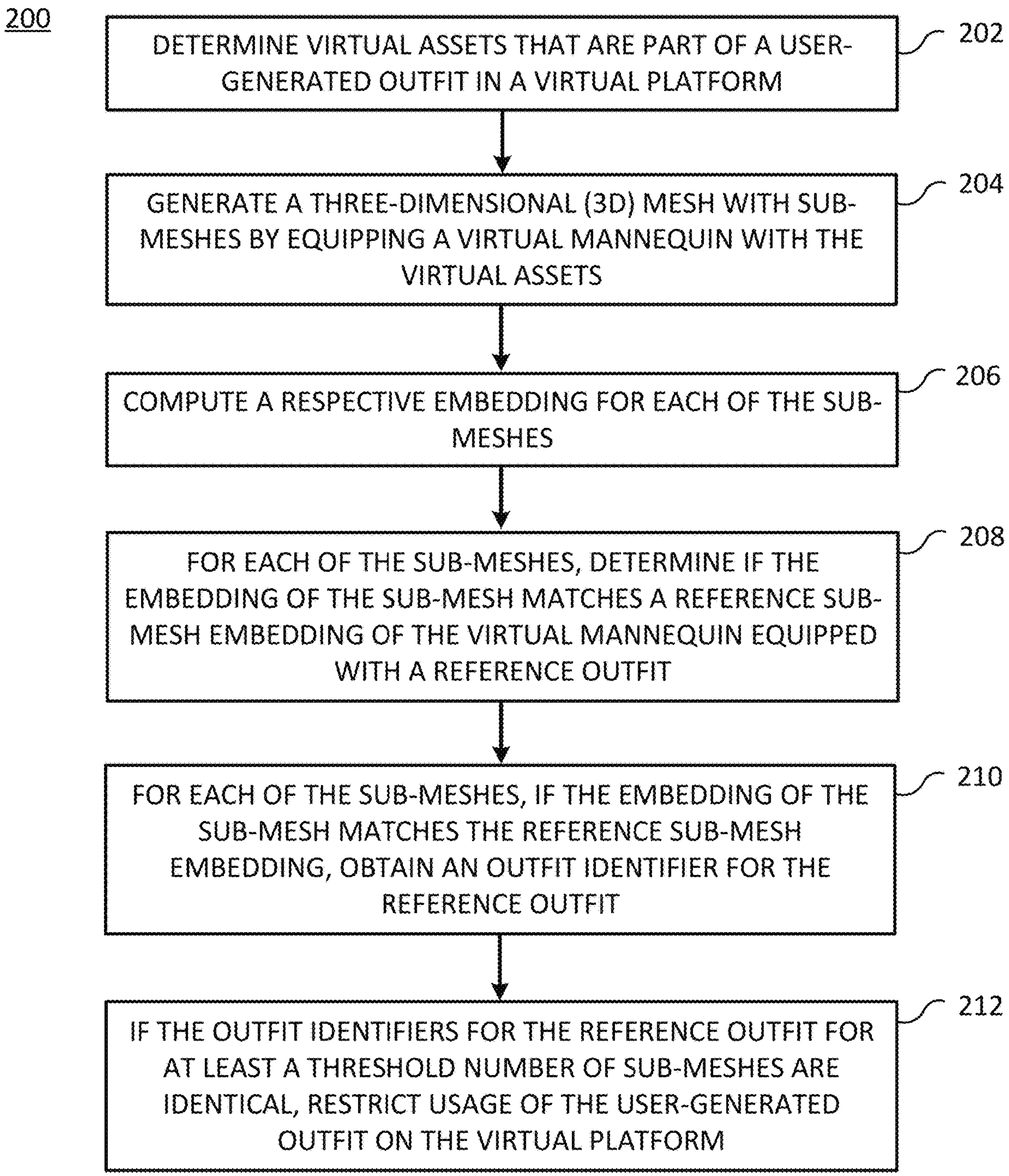
FIG. 2 is a flow diagram illustrating an example method to perform copy detection for virtual assets, in accordance with some implementations.

FIG. 2 is a flow diagram illustrating an example method 200 to perform copy detection for virtual assets, in accordance with some implementations. In various implementations, the blocks shown in FIG. 2 and described below may be performed by any of the elements illustrated in FIG. 1, e.g., one or more of client devices 110 and/or online virtual experience server 102. For example, in a distributed simulation, two or more client devices 110 may perform method 200, or at least one client device 110 and online virtual experience server 102 may perform method 200. In some implementations, certain blocks of method 200 may be performed by a client device 110 and other blocks of method 200 may be performed by an online virtual experience server 102. Method 200 begins at block 202.

At block 202, a set of virtual assets are determined that are part of a user-generated outfit in a virtual platform. The user-generated outfit is fittable to an avatar (can be worn by an avatar) that participates in a virtual experience (or in a trial room) on the virtual platform. Virtual assets refer to digital items that can be equipped or applied to an avatar. The assets may include, e.g., clothing, accessories, body parts, textures, animations, or other customizable elements. In some implementations, each virtual asset may have its own digital representation, which can include one or more 3D models, textures, and/or metadata descriptive of the appearance, size, and position of the asset when equipped on the avatar. In some implementations, virtual assets may include interactive objects or tools that the avatar can use during a virtual experience. Some examples of virtual assets include a digital hat, a sword, or a jacket that can be worn by an avatar.

A user-generated outfit may comprise a collection of multiple virtual assets selected by a user to equip an avatar with. The user-generated outfit, once fitted to the avatar, provides a digital representation of the user within the virtual platform. The outfit is customizable, and users may select various virtual assets to create a specific appearance for their avatar. Each outfit may include one or more virtual assets that correspond to specific regions or body parts of the avatar, such as, for example, a hat for the head, shoes for the feet, or armor for the torso. Some virtual assets may fit multiple body parts, e.g., a dress that fits the torso, arms, and legs. In some implementations, the user-generated outfit may include body modifications, such as, for example, altering the height of the avatar or adding wings (or additional arms) to the avatar.

The virtual platform is an online or digital environment in which users can create, modify, and interact with their avatars and virtual assets. In some implementations, the platform is server-based and can support multiple users accessing the platform from various client devices simultaneously. It may provide tools for users to purchase, trade, or create virtual assets, which can be used to customize avatars. The virtual platform hosts various virtual experiences, which are scenarios or activities that users can participate in while equipped with their user-generated outfits. The virtual experiences may include social interactions, gameplay, or other digital environments, such as a virtual concert, a multiplayer game, or a collaborative workspace.

The user-generated outfit is fitted to an avatar that participates in a virtual experience on the virtual platform. The avatar acts as the digital persona of the user within the virtual experience, allowing the user to interact with other users or elements of the virtual experience. The appearance of the avatar is defined by the user-generated outfit, and the actions or behaviors of the avatar may be influenced by the virtual assets equipped in the outfit. For example, if the user-generated outfit includes a sword, the avatar may be able to wield the sword during a gameplay experience. The determination of the set of virtual assets includes identifying which assets from the collection of the user are currently applied to the avatar for use in the virtual experience. The information may be retrieved from the account or session data of the user stored on the servers of the virtual platform. Block 202 is followed by block 204.

At block 204, a 3D mesh is generated, by equipping a virtual mannequin with the set of virtual assets. A 3D mesh represents a digital object or character in three-dimensional space, defined by vertices, edges, and faces that form the structure and surface. The virtual mannequin, equipped with virtual assets, has its visual representation defined by the 3D mesh, with the assets applied to its body. The assets can include items such as clothing, accessories, or tools, all of which contribute to the overall appearance of the mannequin within the virtual platform.

The 3D mesh can include a set of sub-meshes, each corresponding to a particular body part of the virtual mannequin, such as the head, torso, arms, or legs. In some implementations, the sub-meshes may be generated as part of the 3D mesh from the outset, with each virtual asset mapped to a specific body region. In other implementations, the 3D mesh may be divided into sub-meshes after it is generated, with each sub-mesh representing the geometry of the virtual assets applied to a specific body part. In some implementations, arbitrary sub-meshes that do not necessarily map to body parts or regions may be used. For example, in some implementations, accessories can be located around the avatar, such as, e.g., text boxes or pets.

The virtual mannequin itself is a standardized digital model used to represent a consistent form for rendering and equipping virtual assets. The mannequin differs from the avatar of the user, which may be customized in appearance, size, or proportions. The mannequin provides a reference structure that enables virtual assets to be positioned and fitted regardless of the variations that may exist in the avatars of different users. Each part of the mannequin corresponds to a predefined region, such as the head, arms, or torso, which is reflected in the segmentation of the 3D mesh into sub-meshes. In some implementations, the mannequin is represented as a gray body used for moderation purposes when a new asset is created.

In various implementations, sub-meshes can include multiple layers or types of assets, depending on the virtual assets that are part of the user-generated outfit. For example, if both a hat and a helmet are part of the outfit, the sub-mesh corresponding to the head may have multiple layers to represent the different assets. Similarly, a sub-mesh for the torso might include layers representing, e.g., clothing, armor, and/or accessories.

In some implementations, the body parts of the virtual mannequin include at least two or more of the following: head, torso, left arm, right arm, left leg, and right leg. Each of the body parts corresponds to a specific region of the virtual mannequin, and each region may have one or more virtual assets applied to it. When the user-generated outfit is equipped on the virtual mannequin, the 3D mesh of the outfit is segmented into sub-meshes, with each sub-mesh corresponding to one of the body parts of the virtual mannequin.

In some implementations, the segmentation of the 3D mesh into sub-meshes is based on the predefined body parts. For example, the sub-mesh corresponding to the head will include any virtual assets that are worn on the head of the virtual mannequin, such as, e.g., helmets, hats, or other headgear. Similarly, the sub-meshes for the torso, arms, and legs will represent the virtual assets applied to those respective body parts, such as, e.g., armor, clothing, or accessories. The structure allows each sub-mesh to be analyzed and compared separately, as each body part of the virtual mannequin is treated as an independent region for the purpose of computing and comparing embeddings. In some implementations, not all body parts of the virtual mannequin need to be represented by sub-meshes. For example, if a user-generated outfit includes assets that only cover the head and torso, the corresponding sub-meshes will be created only for the two body parts, without generating sub-meshes for the arms or legs. Block 204 is followed by block 206.

At block 206, a respective embedding is computed for each sub-mesh in the set of sub-meshes, where the respective embedding is a HoG embedding. An embedding may constitute a mathematical representation of an object, in this case, a sub-mesh, which is transformed into a vector in a multi-dimensional space. The purpose of an embedding is to encode the geometric features of the sub-mesh in a way that allows for comparison and analysis by computational models. Each sub-mesh has its own unique embedding, which captures the specific details of its structure, including shape, orientation, and spatial relationships.

The respective embedding for each sub-mesh is computed as a Histogram of Oriented Gradients (HoG) embedding. A HoG embedding is a feature descriptor that captures the distribution of gradient directions within a region of an image or 3D model. In various implementations, for a given sub-mesh, the HoG embedding is generated by dividing the surface into smaller sections and calculating the gradients of each section. The gradients represent changes in the surface geometry, such as, e.g., edges, corners, and textures. The HoG descriptor quantifies the gradients into histograms that summarize the dominant orientations within each section, creating a vector that characterizes the overall structure of the sub-mesh.

In some implementations, the HoG embedding for a sub-mesh may be computed after the sub-mesh has been segmented from the 3D mesh, while in some implementations, the embedding may be generated directly as part of sub-mesh creation. The HoG embedding serves to create a compact and descriptive representation of the geometric features of the sub-mesh. For example, a sub-mesh corresponding to the head of a virtual mannequin may have gradients that capture the shape of a helmet or hat, while a sub-mesh for the torso might capture the contours of armor or clothing. The HoG embedding allows for the structural details to be encoded in a manner suitable for comparison with other sub-meshes. Block 206 is followed by block 208.

At block 208, for each sub-mesh in the set of sub-meshes, it is determined whether the embedding of the sub-mesh matches a reference sub-mesh embedding of the virtual mannequin equipped with a reference outfit. A reference sub-mesh embedding may constitute a precomputed embedding associated with a sub-mesh of a virtual mannequin that has been equipped with a known outfit, referred to as a reference outfit. The reference outfit represents a specific set of virtual assets, e.g., high-value or limited-edition items, which have been indexed for comparison purposes. The reference sub-mesh embedding captures the geometric properties of the assets in the same way that embeddings are generated for the user-generated outfit.

In various implementations, a reference outfit may be platform-provided or user-generated. Reference outfits are considered to be genuine and legitimate virtual assets within the platform. In various implementations, these outfits may be associated with various constraints, such as, for example, being available for a limited time (e.g., during a holiday event), having a total count limit (e.g., only 100 copies of the outfit being available within the platform), or being associated with a particular price (e.g., a specific price in virtual currency). For example, a reference outfit could be a rare, Thanksgiving-themed item available only for a short period, or a high-value outfit sold for 10,000 units of the platform's virtual currency with a limit of 50 copies.

Comparison includes matching the embedding of each sub-mesh from the user-generated outfit to one or more reference sub-mesh embeddings. The comparison is used to determine whether the virtual assets in the user-generated outfit correspond, either in part or entirely, to a reference outfit. For example, if the user-generated outfit includes a hat, the HoG embedding of the sub-mesh corresponding to the head is compared with the reference sub-mesh embedding of the head from the reference outfit. If the embedding of the user-generated sub-mesh closely matches those of the reference sub-mesh, a match is identified.

In some implementations, matching may involve calculating a similarity score between the embedding of the sub-mesh from the user-generated outfit and the reference sub-mesh embedding. The score quantifies how closely the two embeddings resemble one another. A higher score may indicate a stronger match, meaning the virtual asset in the user-generated outfit is highly similar to the asset in the reference outfit. For example, if the user-generated outfit includes armor that closely resembles a high-value reference outfit, the sub-mesh embedding for the torso may have a high similarity score when compared to the reference sub-mesh embedding for the torso of the virtual mannequin equipped with the reference outfit.

In some implementations, embeddings associated with reference outfits are stored in an index for the purpose of identifying matches. In some implementations, the reference outfits are pre-defined and may represent items that are valuable, limited in quantity, or at risk of unauthorized replication. Each reference outfit is broken down into sub-meshes, and the embeddings for the sub-meshes are pre-computed (e.g., offline, prior to performing comparisons with user-generated outfits) and stored. When the matching is performed, the precomputed reference sub-mesh embeddings are utilized to determine whether the user-generated outfit contains any assets that replicate those of a reference outfit.

In some implementations, determining whether the embedding of the sub-mesh matches the reference sub-mesh embedding includes an index of stored embeddings being searched. The index is a data structure that contains embeddings computed for sub-meshes of various reference outfits, including the reference outfit. Each reference outfit is represented by its set of sub-meshes, and each sub-mesh is associated with a respective embedding. The embeddings in the index serve as a reference dataset for comparing embeddings of sub-meshes from user-generated outfits. The embedding of each sub-mesh in the user-generated outfit is compared to the stored embeddings in the index to identify potential matches.

The stored embeddings are linked to specific sub-meshes of reference outfits, where each sub-mesh corresponds to a body part of a virtual mannequin equipped with a reference outfit. For example, sub-meshes for the head, torso, arms, and legs may each have their own embeddings stored in the index. When a user-generated outfit is being analyzed, the embedding for each sub-mesh is retrieved and a search operation is performed within the index to locate a matching reference sub-mesh embedding. In some implementations, the search may involve comparing the features captured by the Histogram of Oriented Gradients (HoG) embedding of the sub-mesh from the user-generated outfit with the stored embeddings.

In some implementations, the index may be structured in various ways to support retrieval of stored embeddings. In some implementations, the index may be organized as a key-value store, where each key corresponds to a reference sub-mesh embedding and the value contains metadata related to the reference outfit and the body part associated with the embedding. When the embedding of a sub-mesh is computed from a user-generated outfit, a search operation is performed by comparing the embedding to the stored keys in the index. The result of the search identifies one or more matching embeddings, which may be analyzed to determine if they correspond to the same reference outfit based on their metadata.

In some cases, the search may return multiple candidate embeddings from the index, particularly if several reference sub-meshes are similar in geometry. In such cases, additional filtering or comparison techniques may be applied to narrow down the matches. For example, a similarity score may be computed between the embedding of the sub-mesh from the user-generated outfit and each of the stored embeddings in the index. The score quantifies the degree of similarity, and the highest-scoring embeddings may be selected as potential matches. Once matching embeddings are identified, the corresponding outfit identifiers for the reference outfit can be retrieved for processing.

In some implementations, determining if the embedding of the sub-mesh matches the reference sub-mesh embedding includes applying a hash function to the embedding of the sub-mesh to obtain a hash value. The hash value is unique to the embedding of the sub-mesh and serves as a compact representation of the geometric data captured by the embedding. By applying the hash function, the embedding is transformed into a fixed-size output, which can be used for comparison purposes during subsequent operations.

In some implementations, a lookup operation is performed to determine whether the generated hash value is present in a Bloom filter. The Bloom filter is a probabilistic data structure, represented as a bit array, which is used to check for membership in a set. In this case, the set represents hash values corresponding to sub-meshes of a plurality of reference outfits. Individual bits of the bit array in the Bloom filter are set based on respective hash values obtained by applying the same hash function to the embeddings of reference sub-meshes. The lookup includes the Bloom filter being checked to determine if the hash value of the sub-mesh embedding from the user-generated outfit is present in the filter.

If the hash value is not present in the Bloom filter, it is determined that the embedding of the sub-mesh matches no reference sub-mesh. The absence of the hash value in the Bloom filter indicates that the sub-mesh embedding of the user-generated outfit does not correspond to any of the reference sub-mesh embeddings that are stored. Use of a Bloom filter that allows determination of presence of matching HoG embeddings in reference outfits querying without performing actual comparisons of sub-mesh embeddings for a user-generated outfit with those of reference sub-meshes. Block 208 is followed by block 210.

At block 210, for each sub-mesh in the set of sub-meshes, if the embedding of the sub-mesh matches the reference sub-mesh embedding, an outfit identifier for the reference outfit is obtained. An outfit identifier is a unique identifier associated with a reference outfit that is used to label or tag the outfit for tracking and comparison purposes. The outfit identifier serves as a pointer to the specific reference outfit that has been matched during embedding comparison.

When a match between the embedding of a sub-mesh from the user-generated outfit and a reference sub-mesh embedding is identified, the outfit identifier linked to the reference outfit is retrieved. The reference outfit is composed of a set of virtual assets, and each virtual asset in the reference outfit corresponds to a sub-mesh of the virtual mannequin. For example, if a match is found between the head sub-mesh of the user-generated outfit and the head sub-mesh of the reference outfit, the outfit identifier for that specific reference outfit is obtained to indicate that a portion of the user-generated outfit matches part of the reference outfit.

In some implementations, the outfit identifier may be stored in a database or index that catalogs all known reference outfits, along with their respective sub-mesh embeddings. When a match is found, the identifier acts as a reference, ensuring that the matched sub-mesh can be linked to its corresponding reference outfit.

In some implementations, the outfit identifier may be used to retrieve additional information about the reference outfit, such as its value, rarity, or any restrictions associated with its use. The information can be utilized when determining what actions to take if a match is found, as will be described in more detail below. Block 210 is followed by block 212.

At block 212, if the outfit identifiers for the reference outfit for at least a threshold number of the sub-meshes are identical, usage of the user-generated outfit is restricted on the virtual platform. A threshold number may be a predefined condition where a certain number of sub-meshes from the user-generated outfit must match corresponding sub-meshes from the reference outfit for action to be triggered. The outfit identifiers associated with each matching sub-mesh embedding are evaluated and compared to determine if at least a threshold number of the identifiers are identical, which indicates that a significant portion of the user-generated outfit corresponds to the reference outfit.

The restriction of usage may include actions taken by the virtual platform to limit the functionality or visibility of the user-generated outfit if the number of matching sub-meshes exceeds the threshold. For instance, if the threshold is set to two sub-meshes, and the user-generated outfit contains at least two sub-meshes with embeddings that match those of the reference outfit, restrictions may be imposed such as preventing the user from equipping an avatar with, displaying, or otherwise using the outfit in the virtual experience. The threshold is selected to ensure that partial matches or incidental similarities between individual sub-meshes do not automatically result in restrictions unless a significant portion of the user-generated outfit matches a known reference outfit.

Once the threshold is met, usage restrictions can be applied in various ways, depending on the implementation of the platform. The outfit may be prevented from being worn or displayed on the avatar of the user during a virtual experience, or it may prevent the outfit from being shared, traded, or sold within the platform. For example, if a user-generated outfit contains multiple components that match the sub-meshes of a high-value reference outfit, the platform may block the user-generated outfit from being fitted to avatars until further review. In some implementations, further review may involve manual review, where one or more platform moderators evaluate the flagged user-generated outfit to determine whether it constitutes unauthorized replication, or additional verification may be conducted before making a final decision on whether to restrict usage of the outfit.

In some implementations, restricting the usage of an outfit can affect how the avatar of the user appears in a virtual experience, potentially limiting the ability of the user to display their avatar wearing the outfit. The limitation may impact activities such as social interactions, gaming, or collaborative projects where the user-generated outfit is visible to others or influences gameplay. In some implementations, the decision to restrict outfit usage based on matching sub-meshes is automated or semi-automated.

In some implementations, the set of sub-meshes includes at least two sub-meshes, and the threshold number of the sub-meshes is set to two. In order for action to be taken, such as restricting the usage of a user-generated outfit, at least two sub-meshes must match corresponding sub-meshes of a reference outfit. The threshold is a predefined condition that dictates when it is determined that the user-generated outfit sufficiently resembles a reference outfit based on the number of matching sub-meshes.

In some implementations, each sub-mesh in the user-generated outfit represents a portion of the avatar, such as the head, torso, arms, or legs, and is associated with a specific embedding that captures the properties of that part of the outfit. For a match to be identified, the embedding of each sub-mesh from the user-generated outfit is compared with the reference sub-mesh embeddings stored in the index. If two or more sub-meshes match the corresponding sub-meshes of a reference outfit, analysis or restrictions are performed based on the matched reference outfit.

In some implementations, a requirement that at least two sub-meshes must match ensures that partial matches, such as a single item resembling a part of a reference outfit, do not trigger unnecessary restrictions on the user-generated outfit. For example, if only the sub-mesh representing the head of the user-generated outfit matches the head sub-mesh of a reference outfit, but no other sub-meshes match, further action is not taken. If both the head and torso sub-meshes match those of a reference outfit, it would constitute sufficient similarity to meet the threshold and appropriate measures are taken.

In some implementations, if the outfit identifiers for the reference outfit are identical for less than the threshold number of sub-meshes, additional analysis is conducted to determine if at least two of the outfit identifiers are identical. The additional analysis is valuable when the initial threshold of matching sub-meshes required to restrict the usage of the user-generated outfit is not met, but there is still the possibility of a partial match. The outfit identifiers track specific reference outfits corresponding to matched sub-mesh embeddings, and identifying two or more identical outfit identifiers indicates that a significant portion of the user-generated outfit may resemble a known reference outfit.

In some implementations, if at least two of the outfit identifiers are identical (indicating that multiple sub-meshes of the user-generated outfit match those of the same reference outfit), the user-generated outfit is flagged for manual review. During manual review, human moderators or administrators may examine the flagged outfit to determine whether it constitutes an unauthorized replication of a reference outfit. The review may include inspecting the matched sub-meshes, reviewing the reference outfit, and deciding whether the user-generated outfit should be restricted or allowed. Flagging the outfit for manual review allows for further evaluation in cases where automation does not provide a conclusive decision regarding the status of the user-generated outfit.

In some implementations, if no two outfit identifiers are identical, further checks are performed. Specifically, if only one outfit identifier is obtained, or if there is no reference sub-mesh embedding that matches any of the sub-mesh embeddings, the usage of the user-generated outfit is permitted on the virtual platform. The permitted usage occurs when the user-generated outfit bears minimal or no resemblance to any known reference outfits, meaning there is insufficient evidence to restrict the outfit. In such cases, the outfit is considered unique or sufficiently different from reference outfits, allowing it to be used, equipped, or displayed by the user without further restriction.

In some implementations, one or more of blocks 202-212 may be performed by one or more server devices, and one or more of blocks 202-212 may be performed by one or more client devices. In some implementations, all of method 200 may be performed by a server device, or by a client device. In some implementations, block 210 or block 212 may be omitted. In some implementations, blocks 204 and 206 may be performed in parallel. In some implementations, one or more of blocks 206, 208, 210, and 212 may be performed in parallel.

Figure 3A:
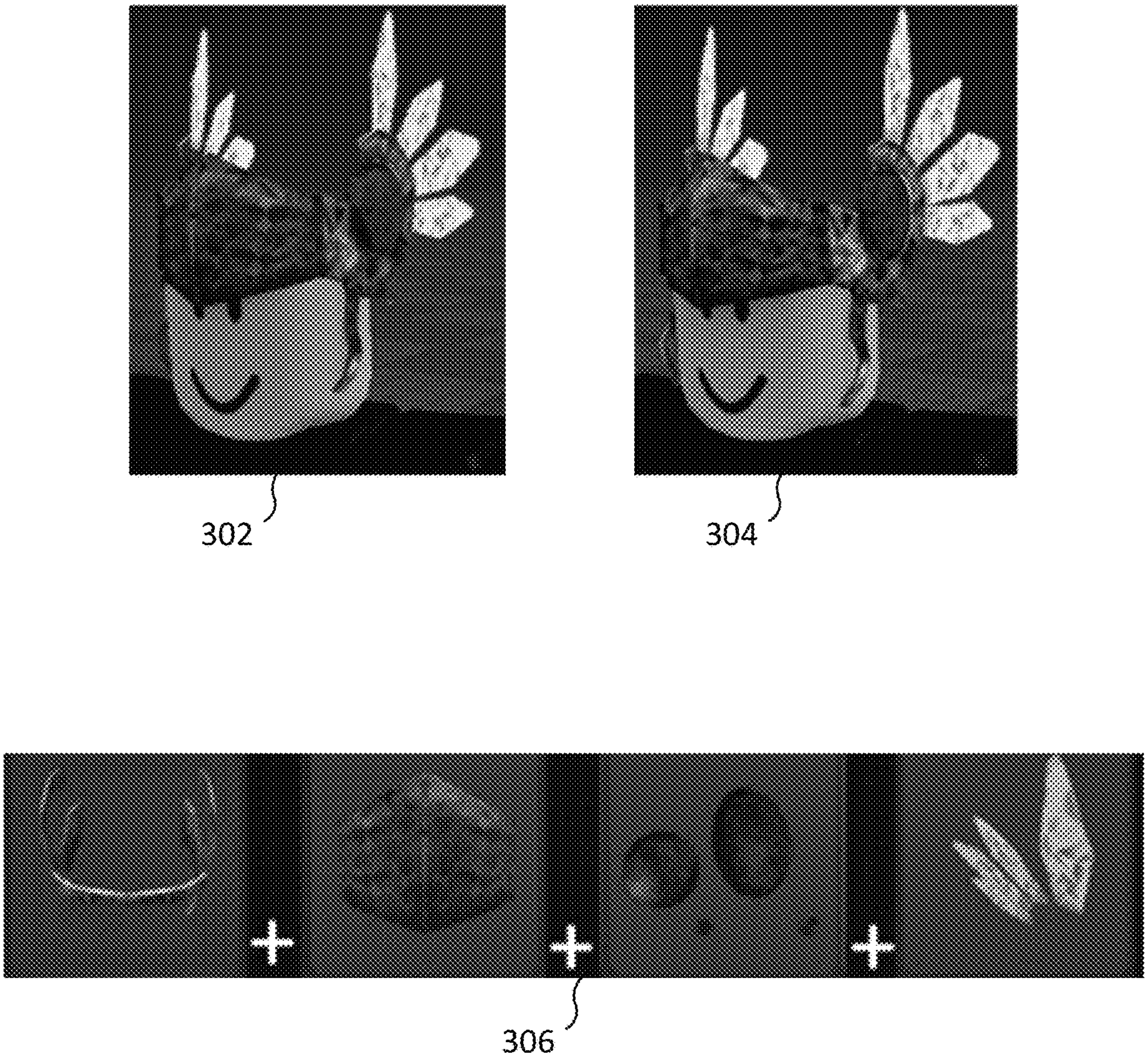
FIG. 3A is a diagram illustrating an example of a copy of virtual assets, in accordance with some implementations.

FIG. 3A is a diagram illustrating an example of a virtual asset replication scenario, in accordance with some implementations. The diagram shows two outfits: the first outfit 302 depicts user-generated content (UGC) that has been used to replicate a rare and limited-edition virtual asset. The second outfit 304 depicts the legitimate, original version of the rare asset within the virtual platform. The UGC creator has fragmented the original asset into multiple components and reassembled them to visually mimic the original, violating the policies of the platform regarding user-generated content.

In the first section, the user-generated outfit 302 is shown as a nearly identical copy of the original rare asset. The UGC creator has reconstructed the appearance of the rare virtual asset by combining several separately uploaded components, resulting in an outfit that is visually indistinguishable from the legitimate version. Although the two outfits appear the same, the user-generated outfit has been built using individual parts that have been designed to bypass detection mechanisms and policies that prohibit direct copying of high-value assets on the platform.

The second section 306 shows the four distinct components that were uploaded as individual user-generated assets, which together replicate the original rare item. The first component, named "Base," mirrors the base of the original asset. The second component, "Tiara," mirrors the main front-facing structure of the headgear. The third component, "Rubies," mirrors the ornamental red gems present on the headgear. The fourth component, "Diamonds," mirrors the spiked elements of the original item, completing the one-to-one identical visual similarity to the legitimate asset.

By uploading the components separately, the UGC creator has avoided triggering automatic detection designed to prevent copying of rare or valuable assets. Each component is treated as an independent user-generated item, allowing the pieces to be sold and equipped without violating platform restrictions on copying complete rare items. When combined, the separate components create a near-identical copy of the original, rare virtual asset, which is shown in outfit 304. The technique allows the UGC creator to bypass content policies while enabling users to obtain and display an unauthorized version of the limited-edition asset.

Figure 3B:
FIG. 3B is a diagram illustrating an example of a copy of virtual assets, in accordance with some implementations.
Figure 3B:
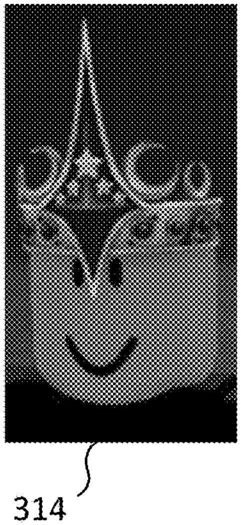
Figure 3B:
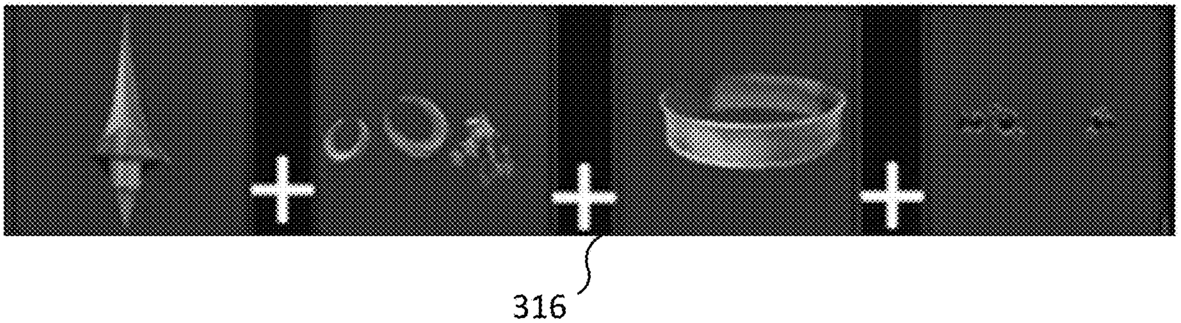

FIG. 3B is a diagram illustrating an example of a copy of virtual assets, in accordance with some implementations. Much like FIG. 3A, FIG. 3B depicts a one-to-one identical copy of a rare, limited edition virtual asset that has been fragmented into separate virtual assets, in violation of user-generated content policies of the virtual platform. The diagram shows two depictions of virtual outfits, the first outfit 312 representing user-generated content (UGC), and the second outfit 314 representing the original, limited-edition rare virtual asset within a virtual platform. The UGC creator has fragmented the original asset, a crown, and uploaded it as four distinct components, violating the content policies of the platform. The original asset has a high price to acquire, making it a highly coveted item in the virtual platform.

In the first section of FIG. 3B, the user-generated outfit 312 replicates the original rare asset 314 in its entirety. The UGC creator has deconstructed the crown into separate parts and uploaded the components individually, allowing users to reassemble them to create a one-to-one visual copy of the rare item. Despite being separated into multiple components, the user-generated outfit 312 is visually indistinguishable from the original rare asset 314 when fully assembled.

The second section 316 of FIG. 3B shows the four individual components that the UGC creator has uploaded to recreate the rare asset. The first component mirrors the main spiked element of the crown, a distinctive feature of the crown. The second component mirrors the ornamental golden loops and jewels that wrap around the crown. The third component mirrors the golden base of the crown. The fourth component represents the red gemstones that adorn the crown, completing the visual match to the original rare asset.

Figure 4:
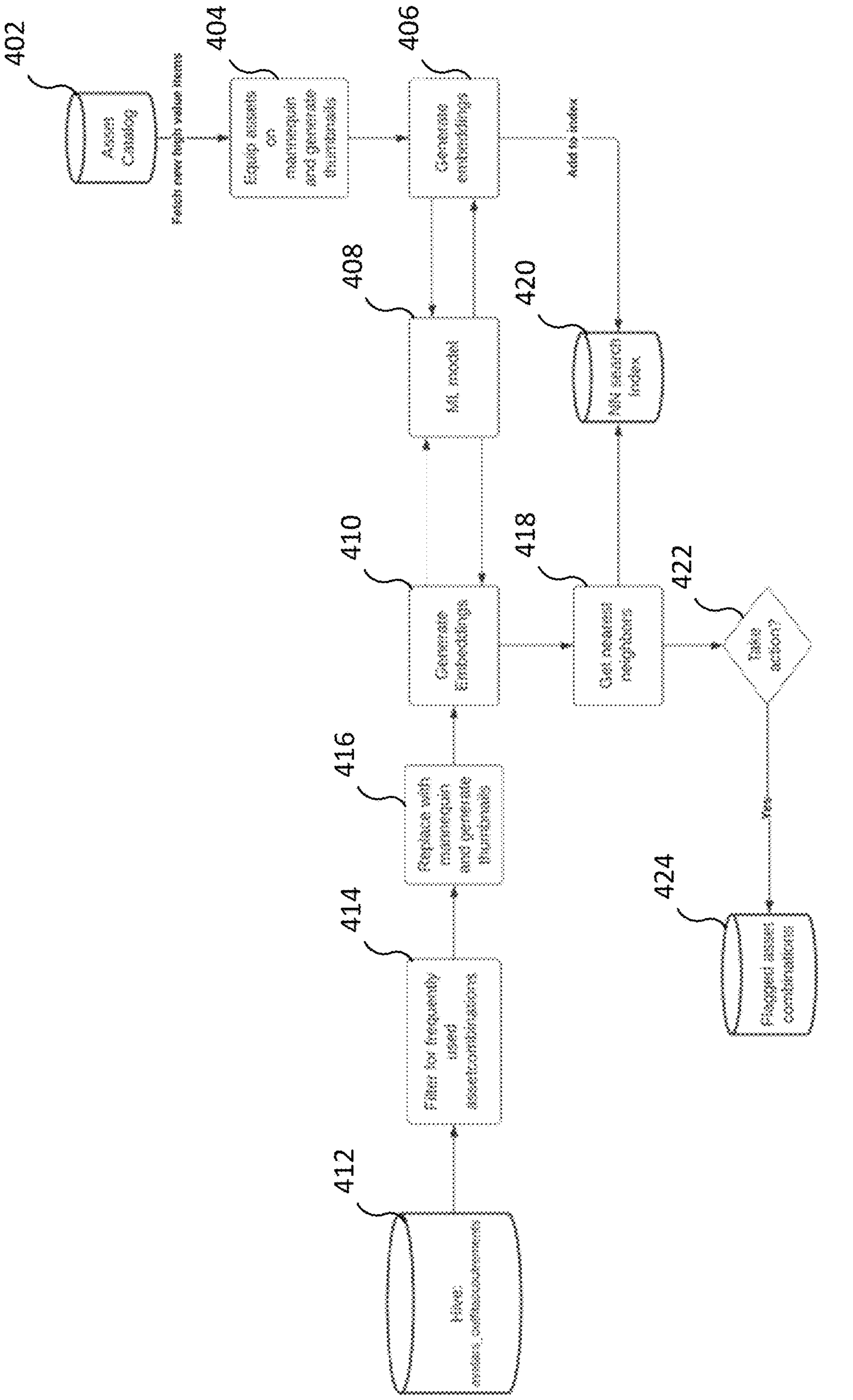
FIG. 4 is a diagram illustrating an example of a pipeline to perform copy detection for virtual assets, in accordance with some implementations.

FIG. 4 is a diagram illustrating an example of an overall pipeline for fragmented copy detection for virtual assets, in accordance with some implementations. The pipeline is designed to identify instances where a user-generated outfit, composed of multiple virtual assets, matches or replicates a known high-value or limited-edition virtual asset by fragmenting and reassembling its components. The flow depicted in FIG. 4 includes several stages, each focused on processing virtual assets, generating embeddings, and comparing user-generated content against a reference index of known assets.

Two parallel flows are performed in the example. On the right side, the Asset Catalog 402 serves as a repository of virtual items that are to be protected against unauthorized duplication. New assets are fetched from the catalog at block 404, where the assets are equipped onto a virtual mannequin, and 3D thumbnails are generated. The thumbnails, at block 406, are processed to generate embeddings—mathematical representations that capture the visual and geometric features of each asset. The embeddings are stored in a Nearest Neighbor (NN) Search Index 420, which is later used to perform similarity searches against user-generated assets.

On the left side of the flow, user-generated outfits and asset combinations are collected from the Hive 412, which stores data about avatars, outfit combinations, and the various accessories used by users in the virtual platform. At block 414, frequently used asset combinations are filtered and identified for further processing. Once identified, the outfits are equipped onto a mannequin at block 416, and corresponding thumbnails are generated. Further steps, at block 410, include generating embeddings for the user-generated outfit thumbnails. The embeddings serve as the key input for comparison against the reference embeddings stored in the NN Search Index.

At block 418, the embeddings generated from user-generated content are used to perform a nearest-neighbor search, retrieving similar embeddings from the reference database. The search provides the closest matches between the user-generated outfit and the known high-value virtual assets. If a match is found, the pipeline proceeds to block 422, where a decision is made on whether to take further action. The decision may involve flagging the user-generated outfit for potential violations of the policies of the virtual platform, particularly if it is determined that the outfit closely replicates a rare or valuable asset through fragmented copying. If a violation is detected, the asset combination is flagged and stored in the Flagged Asset Combinations repository 424 for further review or enforcement actions.

The flow incorporates an ML Model 408 that can be used to refine embedding generation and comparison. By applying machine learning techniques, subtle similarities can be detected between user-generated content and reference assets, improving the accuracy of the fragmented copy detection mechanism. The ML model functions in conjunction with the embedding generation to ensure that the data being compared is representative of both geometric and visual characteristics of the virtual assets.

Figure 5:
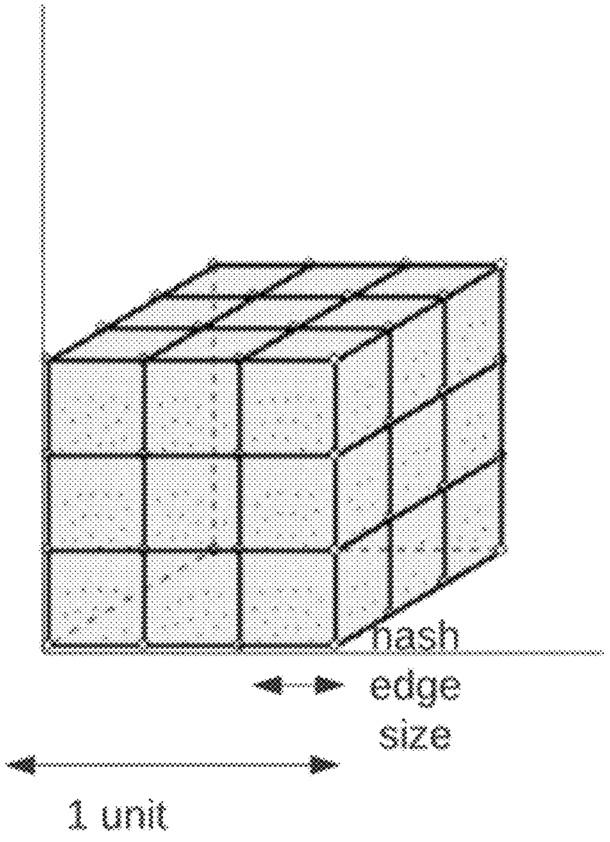
FIG. 5 is a diagram illustrating an example of reducing search traffic using HoG embedding and hashing, in accordance with some implementations.

FIG. 5 is a diagram illustrating an example of reducing search traffic using HoG embedding and hashing, in accordance with some implementations. The diagram depicts a 3D unit cube, where the hash edge size corresponds to segments that divide the cube into smaller, bounded regions. The properties of Histogram of Oriented Gradients (HoG) descriptors are utilized to reduce the number of comparisons required during search operations in a virtual platform. Specifically, the diagram demonstrates how simple edge length-based hashing can be applied to generate locality-sensitive hashes.

In this context, each HoG descriptor represents a specific feature of a sub-mesh within a 3D virtual asset. The descriptors are bounded by unit cubes, as illustrated in FIG. 5, where the 3D space is divided into discrete regions. By applying a hashing function that takes into account the edge size of the cubes, a hash value can be generated for each HoG descriptor. The hashing mechanism creates locality-sensitive hashes, meaning that similar descriptors will map to hash values that are close to each other.

The hash edge size depicted in FIG. 5 represents the resolution at which the hashing function operates. By adjusting the edge size, the granularity of the hash can be controlled. A smaller edge size results in fine-grained hashing, capturing subtle variations in the descriptors, while a larger edge size creates coarser hashes that prioritize broader similarities.

Computing Device

Figure 6:
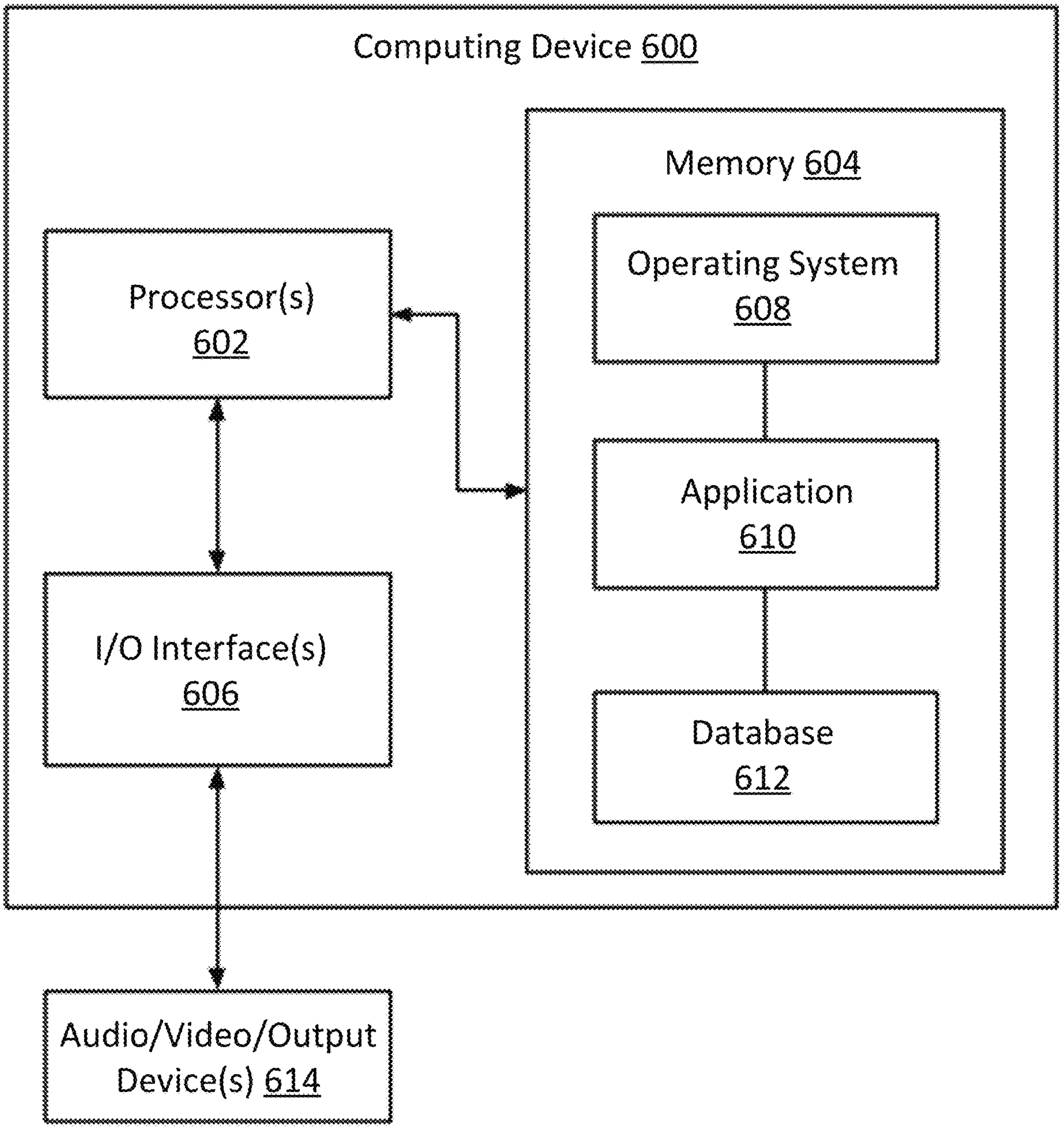
FIG. 6 is a block diagram that illustrates an example computing device, in accordance with some implementations.

FIG. 6 is a block diagram of an example computing device 600 which may be used to implement one or more techniques described herein, including one or more techniques described with reference to FIG. 2, FIG. 3, and FIG. 4. In one example, device 600 may be used to implement a computer device (e.g., 102 and/or 110 of FIG. 1), and perform appropriate method implementations described herein. Computing device 600 can be any suitable computer system, server, or other electronic or hardware device. For example, the computing device 600 can be a mainframe computer, desktop computer, workstation, portable computer, or electronic device (portable device, mobile device, cell phone, smartphone, tablet computer, television, TV set top box, personal digital assistant (PDA), media player, game device, wearable device, etc.). In some implementations, device 600 includes a processor 602, a memory 604, an input/output (I/O) interface 606, and audio/video input/output devices 614.

Processor 602 can be one or more processors and/or processing circuits to execute program code and control basic operations of the device 600. A "processor" includes any suitable hardware and/or software system, mechanism or component that processes data, signals or other information. A processor may include a system with a general-purpose central processing unit (CPU), multiple processing units, dedicated circuitry for achieving functionality, or other systems. Processing need not be limited to a particular geographic location, or have temporal limitations. For example, a processor may perform its functions in "real-time," "near-real-time", "offline," in a "batch mode," etc. Portions of processing may be performed at different times and at different locations, by different (or the same) processing systems. A computer may be any processor in communication with a memory.

Memory 604 is provided in device 600 for access by the processor 602, and may be any suitable computer-readable or processor-readable storage medium, e.g., random access memory (RAM), read-only memory (ROM), Electrical Erasable Read-only Memory (EEPROM), Flash memory, etc., suitable for storing instructions for execution by the processor, and located separate from processor 602 and/or integrated therewith. Memory 604 can store software operating on the server device 600 by the processor 602, including an operating system 608, one or more applications 610, and a database 612 that may store data used by the components of device 600.

Database 612 may store one or more mechanisms, including human body models that are used for pose tracking and avatar animation in a virtual space. In some implementations, database 612 may store human models in association with different virtual experiences, such as avatars for virtual reality (VR), augmented reality (AR) applications, gaming environments, and interactive user interfaces. The models can include different body types, skeletal configurations, and inverse kinematics (IK) chains to support realistic movement simulation. For instance, in a virtual gaming experience, the database might store avatars for diverse characters that are controlled by upper body tracking inputs. In some implementations, database 612 may store other data relevant to body tracking, such as lookup tables for bone length rescaling, configurations for procedural animation systems, and parameters used for temporal smoothing. In some implementations, applications 610 can include instructions that enable processor 602 to execute the described techniques, such as managing the neural network-based pose estimation, processing 2D keypoints, and triggering confidence-based body detection as described with respect to FIG. 4.

For example, applications 610 can include a module that implements one or more neural network models used in the techniques described herein, such as a backbone, 3D head, or temporal smoothing layers. Applications 610 can integrate confidence prediction mechanisms that determine joint visibility and accuracy, triggering body detection or refining motion predictions based on the confidence scores. The applications can employ one or both of the loss functions described, including a) a pairwise difference between the predicted 3D upper body joint positions and the groundtruth 3D joint positions, and/or b) confidence-weighted loss values to adjust predictions based on joint reliability. Database 612 (and/or other connected storage) can store various data used in the described techniques, including input video frames, bounding boxes, 2D keypoints, 3D pose estimations, confidence scores, and parameters used for avatar animation such as rescaled bone lengths and inverse kinematics configurations.

Elements of software in memory 604 can alternatively be stored on any other suitable storage location or computer-readable medium. In addition, memory 604 (and/or other connected storage device(s)) can store instructions and data used in the features described herein. Memory 604 and any other type of storage (magnetic disk, optical disk, magnetic tape, or other tangible media) can be considered "storage" or "storage devices."

I/O interface 606 can provide functions to enable interfacing the server device 600 with other systems and devices. For example, network communication devices, storage devices (e.g., memory and/or data store 120), and input/output devices can communicate via interface 606. In some implementations, the I/O interface can connect to interface devices including input devices (keyboard, pointing device, touchscreen, microphone, camera, scanner, etc.) and/or output devices (display device, speaker devices, printer, motor, etc.).

The audio/video input/output devices 614 can include a variety of devices including a user input device (e.g., a mouse, etc.) that can be used to receive user input, audio output devices (e.g., speakers), and a display device (e.g., screen, monitor, etc.) and/or a combined input and display device, which can be used to provide graphical and/or visual output.

For ease of illustration, FIG. 6 shows one block for each of processor 602, memory 604, I/O interface 606, and software blocks of operating system 608 and virtual experience application 610. The blocks may represent one or more processors or processing circuitries, operating systems, memories, I/O interfaces, applications, and/or software engines. In other implementations, device 600 may not have all of the components shown and/or may have other elements including other types of elements instead of, or in addition to, those shown herein. While the online virtual experience server 102 is described as performing operations as described in some implementations herein, any suitable component or combination of components of online virtual experience server 102, client device 110, or similar system, or any suitable processor or processors associated with such a system, may perform the operations described.

Device 600 can be a server device or client device. Example client devices or user devices can be computer devices including some similar components as the device 600, e.g., processor(s) 602, memory 604, and I/O interface 606. An operating system, software and applications suitable for the client device can be provided in memory and used by the processor. The I/O interface for a client device can be connected to network communication devices, as well as to input and output devices, e.g., a microphone for capturing sound, a camera for capturing images or video, a mouse for capturing user input, a gesture device for recognizing a user gesture, a touchscreen to detect user input, audio speaker devices for outputting sound, a display device for outputting images or video, or other output devices. A display device within the audio/video input/output devices 614, for example, can be connected to (or included in) the device 600 to display images pre- and post-processing as described herein, where such display device can include any suitable display device, e.g., an LCD, LED, or plasma display screen, CRT, television, monitor, touchscreen, 3-D display screen, projector, or other visual display device. Some implementations can provide an audio output device, e.g., voice output or synthesis that speaks text.

One or more methods described herein (e.g., method 200 and other described techniques) can be implemented by computer program instructions or code, which can be executed on a computer. For example, the code can be implemented by one or more digital processors (e.g., microprocessors or other processing circuitry), and can be stored on a computer program product including a non-transitory computer readable medium (e.g., storage medium), e.g., a magnetic, optical, electromagnetic, or semiconductor storage medium, including semiconductor or solid state memory, magnetic tape, a removable computer diskette, a random access memory (RAM), a read-only memory (ROM), flash memory, a rigid magnetic disk, an optical disk, a solid-state memory drive, etc. The program instructions can be contained in, and provided as, an electronic signal, for example in the form of software as a service (SaaS) delivered from a server (e.g., a distributed system and/or a cloud computing system). Alternatively, one or more methods can be implemented in hardware (logic gates, etc.), or in a combination of hardware and software. Example hardware can be programmable processors (e.g., Field-Programmable Gate Array (FPGA), Complex Programmable Logic Device), general purpose processors, graphics processors, Application Specific Integrated Circuits (ASICs), and the like. One or more methods can be performed as part of or component of an application running on the system, or as an application or software running in conjunction with other applications and operating systems.

One or more methods described herein can be run in a standalone program that can be run on any type of computing device, a program run on a web browser, a mobile application ("app") run on a mobile computing device (e.g., cell phone, smartphone, tablet computer, wearable device (wristwatch, armband, jewelry, headwear, goggles, glasses, etc.), laptop computer, etc.). In one example, a client/server architecture can be used, e.g., a mobile computing device (as a client device) sends user input data to a server device and receives from the server the final output data for output (e.g., for display). In another example, all computations can be performed within the mobile app (and/or other apps) on the mobile computing device. In another example, computations can be split between the mobile computing device and one or more server devices.

Although the description has been described with respect to particular implementations thereof, the particular implementations are merely illustrative, and not restrictive. Concepts illustrated in the examples may be applied to other examples and implementations.

The functional blocks, operations, features, methods, devices, and systems described in the present disclosure may be integrated or divided into different combinations of systems, devices, and functional blocks as would be known to those skilled in the art. Any suitable programming language and programming techniques may be used to implement the routines of particular implementations. Different programming techniques may be employed, e.g., procedural or object-oriented. The routines may execute on a single processing device or multiple processors. Although the steps, blocks, operations, or computations may be presented in a specific order, the order may be changed in different particular implementations. In some implementations, multiple steps or operations shown as sequential in this specification may be performed at the same time.

The invention claimed is:

1. A computer-implemented method comprising:

determining a plurality of virtual assets that are part of a user-generated outfit in a virtual platform, the user-generated outfit being fittable to an avatar that participates in a virtual experience on the virtual platform;

generating, by equipping a virtual mannequin with the plurality of virtual assets, a 3D mesh, wherein the 3D mesh comprises a plurality of sub-meshes, each sub-mesh corresponding to a respective body part of the virtual mannequin;

computing a respective embedding for each of the plurality of sub-meshes, wherein the respective embedding is a Histogram of Oriented Gradients (HoG) embedding;

for each of the plurality of sub-meshes, determining if the embedding of the sub-mesh matches a reference sub-mesh embedding of the virtual mannequin equipped with a reference outfit; and if the embedding of the sub-mesh matches the reference sub-mesh embedding, obtaining an outfit identifier for the reference outfit; and if the outfit identifiers for the reference outfit for at least a threshold number of the sub-meshes are identical, restricting usage of the user-generated outfit on the virtual platform.

2. The computer-implemented method of claim 1, wherein determining if the embedding of the sub-mesh matches the reference sub-mesh embedding comprises searching an index of stored embeddings associated with individual sub-meshes of a plurality of reference outfits including the reference outfit.

3. The computer-implemented method of claim 1, wherein the plurality of sub-meshes comprises at least two sub-meshes and the threshold number is two.

4. The computer-implemented method of claim 1, wherein body parts of the virtual mannequin comprise two or more of: head, torso, left arm, right arm, left leg, and right leg.

5. The computer-implemented method of claim 1, wherein restricting the usage of the user-generated outfit comprises preventing the outfit from being equipped, displayed, or used by a user within the virtual platform.

6. The computer-implemented method of claim 1, further comprising:

if the outfit identifiers for the reference outfit are identical for less than the threshold number of the sub-meshes, determining if at least two of the outfit identifiers are identical;

if at least two of the outfit identifiers are identical, flagging the user-generated outfit for manual review; and if no two outfit identifiers are identical, if only one outfit identifier is obtained, or if there is no reference sub-mesh embedding that matches any of the plurality of sub-mesh embeddings, permitting usage of the user-generated outfit on the virtual platform.

7. The computer-implemented method of claim 1, wherein determining if the embedding of the sub-mesh matches the reference sub-mesh embedding comprises:

applying a hash function to the embedding of the sub-mesh to obtain a hash value, wherein the hash value is unique to the embedding of the sub-mesh;

performing a lookup operation to determine whether the hash value is present in a Bloom filter, wherein the Bloom filter is a bit array and values of individual bits of the bit array are set based on respective hash values obtained by applying the hash function to sub-meshes of a plurality of reference outfits; and if the hash value is not present in the Bloom filter, determining that the embedding of the sub-mesh matches no reference sub-mesh embedding.

8. A computing device comprising:

one or more processors; and memory coupled to the one or more processors storing instructions that, when executed by the one or more processors, cause the one or more processors to perform operations comprising:

determining a plurality of virtual assets that are part of a user-generated outfit in a virtual platform, the user-generated outfit being fittable to an avatar that participates in a virtual experience on the virtual platform;

generating, by equipping a virtual mannequin with the plurality of virtual assets, a 3D mesh, wherein the 3D mesh comprises a plurality of sub-meshes, each sub-mesh corresponding to a respective body part of the virtual mannequin;

computing a respective embedding for each of the plurality of sub-meshes, wherein the respective embedding is a Histogram of Oriented Gradients (HoG) embedding;

for each of the plurality of sub-meshes, determining if the embedding of the sub-mesh matches a reference sub-mesh embedding of the virtual mannequin equipped with a reference outfit; and if the embedding of the sub-mesh matches the reference sub-mesh embedding, obtaining an outfit identifier for the reference outfit; and if the outfit identifiers for the reference outfit for at least a threshold number of the sub-meshes are identical, restricting usage of the user-generated outfit on the virtual platform.

9. The computing device of claim 8, wherein determining if the embedding of the sub-mesh matches the reference sub-mesh embedding comprises searching an index of stored embeddings associated with individual sub-meshes of a plurality of reference outfits including the reference outfit.

10. The computing device of claim 8, wherein the plurality of sub-meshes comprises at least two sub-meshes and the threshold number is two.

11. The computing device of claim 8, wherein body parts of the virtual mannequin comprise two or more of: head, torso, left arm, right arm, left leg, and right leg.

12. The computing device of claim 8, wherein restricting the usage of the user-generated outfit comprises preventing the outfit from being equipped, displayed, and used by a user within the virtual platform.

13. The computing device of claim 8, wherein the instructions cause the one or more processors to perform further operations comprising:

if the outfit identifiers for the reference outfit are identical for less than the threshold number of the sub-meshes, determining if at least two of the outfit identifiers are identical;

if at least two of the outfit identifiers are identical, flagging the user-generated outfit for manual review; and if no two outfit identifiers are identical, if only one outfit identifier is obtained, or if there is no reference sub-mesh embedding that matches any of the plurality of sub-mesh embeddings, permitting usage of the user-generated outfit on the virtual platform.

14. The computing device of claim 8, wherein determining if the embedding of the sub-mesh matches the reference sub-mesh embedding comprises:

applying a hash function to the embedding of the sub-mesh to obtain a hash value, wherein the hash value is unique to the embedding of the sub-mesh;

performing a lookup operation to determine whether the hash value is present in a Bloom filter, wherein the Bloom filter is a bit array and values of individual bits of the bit array are set based on respective hash values obtained by applying the hash function to sub-meshes of a plurality of reference outfits; and if the hash value is not present in the Bloom filter, determining that the embedding of the sub-mesh matches no reference sub-mesh embedding.

15. A non-transitory computer-readable medium with instructions stored thereon that, when executed by a processor, cause the processor to perform operations comprising:

determining a plurality of virtual assets that are part of a user-generated outfit in a virtual platform, the user-generated outfit being fittable to an avatar that participates in a virtual experience on the virtual platform;

generating, by equipping a virtual mannequin with the plurality of virtual assets, a 3D mesh, wherein the 3D mesh comprises a plurality of sub-meshes, each sub-mesh corresponding to a respective body part of the virtual mannequin;

computing a respective embedding for each of the plurality of sub-meshes, wherein the respective embedding is a Histogram of Oriented Gradients (HoG) embedding;

for each of the plurality of sub-meshes, determining if the embedding of the sub-mesh matches a reference sub-mesh embedding of the virtual mannequin equipped with a reference outfit; and if the embedding of the sub-mesh matches the reference sub-mesh embedding, obtaining an outfit identifier for the reference outfit; and if the outfit identifiers for the reference outfit for at least a threshold number of the sub-meshes are identical, restricting usage of the user-generated outfit on the virtual platform.

16. The non-transitory computer-readable medium of claim 15, wherein determining if the embedding of the sub-mesh matches the reference sub-mesh embedding comprises searching an index of stored embeddings associated with individual sub-meshes of a plurality of reference outfits including the reference outfit.

17. The non-transitory computer-readable medium of claim 15, wherein the plurality of sub-meshes comprises at least two sub-meshes and the threshold number is two.

18. The non-transitory computer-readable medium of claim 15, wherein body parts of the virtual mannequin comprise two or more of: head, torso, left arm, right arm, left leg, and right leg.

19. The non-transitory computer-readable medium of claim 15, wherein restricting the usage of the user-generated outfit comprises preventing the outfit from being equipped, displayed, and used by a user within the virtual platform.

20. The non-transitory computer-readable medium of claim 15, wherein the instructions further cause the processor to perform operations comprising:

if the outfit identifiers for the reference outfit are identical for less than the threshold number of the sub-meshes, determining if at least two of the outfit identifiers are identical;

if at least two of the outfit identifiers are identical, flagging the user-generated outfit for manual review; and if no two outfit identifiers are identical, if only one outfit identifier is obtained, or if there is no reference sub-mesh embedding that matches any of the plurality of sub-mesh embeddings, permitting usage of the user-generated outfit on the virtual platform.

* * * * *